United States Patent
Yan et al.

(10) Patent No.: US 12,150,133 B2
(45) Date of Patent: *Nov. 19, 2024

(54) UPLINK CONTROL INFORMATION SENDING METHOD, UPLINK CONTROL INFORMATION RECEIVING METHOD, APPARATUS, AND SYSTEM

(71) Applicant: HUAWEI TECHNOLOGIES CO., LTD., Guangdong (CN)

(72) Inventors: Zhiyu Yan, Shenzhen (CN); Lei Guan, Beijing (CN); Yongxia Lyu, Shenzhen (CN)

(73) Assignee: Huawei Technologies Co., Ltd., Shenzhen (CN)

(*) Notice: Subject to any disclaimer, the term of this patent is extended or adjusted under 35 U.S.C. 154(b) by 0 days.

This patent is subject to a terminal disclaimer.

(21) Appl. No.: 18/147,558

(22) Filed: Dec. 28, 2022

(65) Prior Publication Data

US 2023/0217449 A1 Jul. 6, 2023

Related U.S. Application Data

(63) Continuation of application No. 17/024,090, filed on Sep. 17, 2020, now Pat. No. 11,558,860, which is a (Continued)

(51) Int. Cl.
*H04W 72/02* (2009.01)
*H04L 1/1607* (2023.01)
(Continued)

(52) U.S. Cl.
CPC ........... *H04W 72/21* (2023.01); *H04L 1/1657* (2013.01); *H04L 5/0055* (2013.01);
(Continued)

(58) Field of Classification Search
CPC ..... H04W 72/04; H04W 28/26; H04W 72/02; H04W 72/21; H04W 28/06; H04L 5/0055;
(Continued)

(56) References Cited

U.S. PATENT DOCUMENTS 8,797,985 B2    8/2014   Larsson et al.
9,967,062 B2 *  5/2018   Chae ................ H04L 1/1861
(Continued)

FOREIGN PATENT DOCUMENTS

CN    102378373 A    3/2012
CN    102742206 A    10/2012
(Continued)

OTHER PUBLICATIONS

Panasonic, "UCI resource size on PUSCH with SU-MIMO transmission," 3GPP TSG RAN WG1 Meeting #62, R1-104904, Madrid, Spain, Aug. 23-27, 2010, 4 pages.
(Continued)

*Primary Examiner* — Brian D Nguyen
(74) *Attorney, Agent, or Firm* — Fish & Richardson P.C.

(57) ABSTRACT

Embodiments of the present invention provide an uplink control information sending method, an uplink control information receiving method, an apparatus, and a system. The method includes: receiving, by a terminal device, channel indication information from an access network device on a physical control channel; determining the channel resource set that is of N channel resource sets and that matches a type or a size of the UCI as a first channel resource set; determining a channel resource that is in the first channel resource set and that is indicated by the channel indication information; and sending uplink control information UCI to the access network device on the channel resource. A quantity of bits that need to be added to the channel indication infor-
(Continued)

mation in the embodiments of the present invention is less than that in the prior art.

20 Claims, 10 Drawing Sheets

Related U.S. Application Data continuation of application No. 16/540,434, filed on Aug. 14, 2019, now Pat. No. 10,785,757, which is a continuation of application No. 15/890,915, filed on Feb. 7, 2018, now Pat. No. 10,736,085, which is a continuation of application No. PCT/CN2015/086763, filed on Aug. 12, 2015.

(51) Int. Cl.
| | |
|---|---|
| *H04L 5/00* | (2006.01) |
| *H04W 28/06* | (2009.01) |
| *H04W 28/26* | (2009.01) |
| *H04W 72/04* | (2023.01) |
| *H04W 72/21* | (2023.01) |
| *H04L 1/00* | (2006.01) |
| *H04L 1/08* | (2006.01) |

(52) U.S. Cl.
CPC .......... *H04L 5/0057* (2013.01); *H04L 5/0094* (2013.01); *H04W 28/06* (2013.01); *H04W 28/26* (2013.01); *H04W 72/02* (2013.01); *H04W 72/04* (2013.01); *H04L 1/0001* (2013.01); *H04L 1/0073* (2013.01); *H04L 1/08* (2013.01)

(58) Field of Classification Search
CPC ... H04L 5/0057; H04L 1/1657; H04L 5/0094; H04L 1/0001; H04L 1/0073; H04L 1/08
See application file for complete search history.

(56) References Cited

U.S. PATENT DOCUMENTS

| | | | | |
|---|---|---|---|---|
| 10,149,256 | B2* | 12/2018 | Lee | H04W 52/346 |
| 10,158,461 | B2* | 12/2018 | Li | H04L 1/1671 |
| 11,637,659 | B2* | 4/2023 | Fu | H04B 7/0636 370/329 |
| 2011/0170499 | A1 | 7/2011 | Nazar et al. | |
| 2013/0083741 | A1 | 4/2013 | Larsson et al. | |
| 2013/0155917 | A1 | 6/2013 | Hu et al. | |
| 2013/0188590 | A1 | 7/2013 | Aiba et al. | |
| 2013/0301600 | A1 | 11/2013 | Park | |
| 2013/0322358 | A1 | 12/2013 | He et al. | |
| 2014/0036810 | A1 | 2/2014 | Harrison et al. | |
| 2014/0226608 | A1 | 8/2014 | Seo et al. | |
| 2014/0362792 | A1 | 12/2014 | Cheng et al. | |
| 2015/0085797 | A1 | 3/2015 | Ji et al. | |
| 2015/0098428 | A1 | 4/2015 | Enomoto et al. | |
| 2015/0312071 | A1 | 10/2015 | Chen et al. | |
| 2015/0358124 | A1 | 12/2015 | Suzuki | |
| 2016/0028520 | A1 | 1/2016 | Nogami et al. | |
| 2016/0065350 | A1 | 3/2016 | Suzuki et al. | |
| 2016/0112992 | A1* | 4/2016 | Bhushan | H04W 72/04 370/330 |
| 2016/0150508 | A1 | 5/2016 | Elbwart et al. | |
| 2017/0251491 | A1* | 8/2017 | Qiang | H04L 1/1861 |
| 2018/0338339 | A1 | 11/2018 | Song | |

FOREIGN PATENT DOCUMENTS

| | | |
|---|---|---|
| CN | 102754381 A | 10/2012 |
| CN | 103209483 A | 7/2013 |
| CN | 102355325 A | 2/2015 |
| WO | 2014121511 A1 | 8/2014 |

OTHER PUBLICATIONS

CATR, "consideration on UCI transmission on PUCCH for LTE-A," 3GPP TSG RAN WG1 Meeting #62bis, R1-105645, Xi'an, China, Oct. 11-15, 2010, 3 pages.
Office Action in Chinese Appln. No. 202010549395.6, dated May 13, 2023, 6 pages.
3GPP TS 36.211 V12.6.0 (Jun. 2015), "3rd Generation Partnership Project; Technical Specification Group Radio Access Network; Evolved Universal Terrestrial Radio Access (E-UTRA), Physical channels and modulation (Release 12)," Jun. 2015, 136 pages.
3GPP TS 36.211 V8.3.0, "3rd Generation Partnership Project; Technical Specification Group Radio Access Network; Evolved Universal Terrestrial Radio Access (E-UTRA); Physical Channels and Modulation (Release 8)," May 2008, 77 pages.
3GPP TS 36.213 V12.3.0, "3rd Generation Partnership Project; Technical Specification Group Radio Access Network; Evolved Universal Terrestrial Radio Access (E-UTRA); Physical layer procedures (Release 12)," Sep. 2014, 212 pages.
3GPP TS 36.213 V8.3.0, "3rd Generation Partnership Project; Technical Specification Group Radio Access Network; Evolved Universal Terrestrial Radio Access (E-UTRA); Physical layer procedures (Release 8)," May 2008, 45 pages.
Samsung, "PUCCH HARQ-ACK Resource Indexing for DL CA," 3GPP TSG RAN WG1 #61, R1-103002, May 10-14, 2010, 3 pages.
Communication pursuant to Article 94(3) EPC issued in European Application No. 15900752.5 on Apr. 10, 2019, 5 pages.
Extended European Search Report issued in European Application No. 15900752.5 on Jun. 13, 2018, 11 pages.
International Search Report issued in International Application No. PCT/CN2015/086763 on May 13, 2016, 6 pages.
Office Action issued in Chinese Application No. 201580080412.3 on Jun. 4, 2019, 10 pages.
LG Electronics, "Enhancements to UCI on PUSCH for Rel-13 CA," 3GPP TSG RAN WG1 Meeting #80bis, R1-151503, 1 Belgrade, Serbia, Apr. 20-24, 2015, 4 pages.

* cited by examiner

An access network device sends channel indication information to a terminal device on a physical control channel, so that the terminal device determines a first channel resource of N channel resources according to the channel indication information, and increases or decreases the first channel resource to obtain a second channel resource, where N is a positive integer greater than or equal to 2, and the N channel resources are preconfigured by the access network device for the terminal device — S1001

The access network device receives uplink control information UCI sent by the terminal device on the second channel resource — S1002

FIG. 10

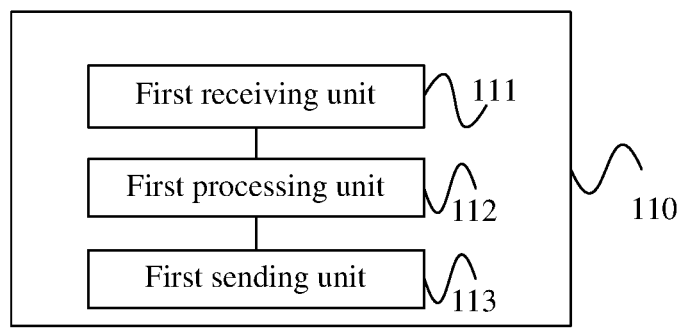

FIG. 11

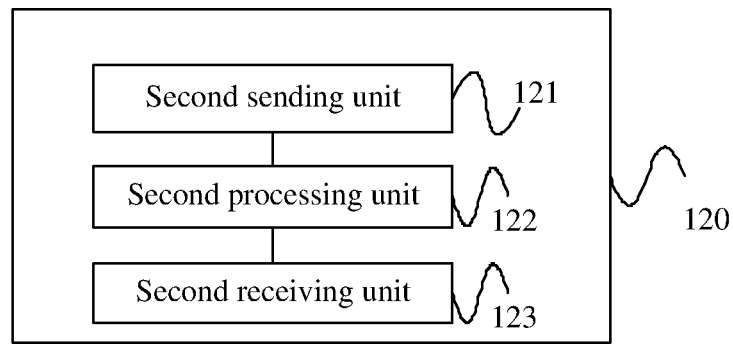

FIG. 12

UPLINK CONTROL INFORMATION SENDING METHOD, UPLINK CONTROL INFORMATION RECEIVING METHOD, APPARATUS, AND SYSTEM

CROSS-REFERENCE TO RELATED APPLICATION

This application is a continuation of U.S. patent application Ser. No. 17/024,090, filed on Sep. 17, 2020, now U.S. Pat. No. 11,558,860, which is a continuation of U.S. patent application Ser. No. 16/540,434, filed on Aug. 14, 2019, now U.S. Pat. No. 10,785,757, which is a continuation of U.S. patent application Ser. No. 15/890,915, filed on Feb. 7, 2018, U.S. Pat. No. 10,736,085, which is a continuation of International Application No. PCT/CN2015/086763, filed on Aug. 12, 2015. All of the afore-mentioned patent applications are hereby incorporated by reference in their entireties.

TECHNICAL FIELD

Embodiments of the present invention relate to the field of communications technologies, and in particular, to an uplink control information sending method, an uplink control information receiving method, an apparatus, and a system.

BACKGROUND

In a Long Term Evolution (LTE) system, an access network device sends downlink data to a same terminal device on at least one of multiple carriers. For downlink data on each carrier, the terminal device separately performs acknowledgment and generates hybrid automatic repeat request-acknowledgment HARQ-ACK information. If acknowledgment succeeds, the terminal device returns acknowledgment information ACK. If acknowledgment fails, the terminal device returns negative acknowledgment information NACK. The terminal device sends each piece of acknowledgment information to the access network device on a same uplink channel. In addition, the access network device sends a reference signal to the terminal device on each carrier, so that the terminal device detects the reference signal on each carrier to obtain channel state information (CSI) corresponding to each carrier.

In the prior art, the access network device indicates, by using preconfigured information, a subframe location (which is determined by a subframe offset for feeding back CSI and a period for feeding back the CSI) at which the terminal device feeds back periodic CSI and specific content of the periodic CSI fed back at each location for feeding back the periodic CSI. Herein, the acknowledgment information and/or the CSI are all referred to as uplink control information (UCI). Therefore, UCI fed back by the terminal device to the access network device on the uplink channel in some subframes includes only acknowledgment information or includes only periodic CSI information, while UCI fed back in some subframes includes both acknowledgment information and CSI. Because a quantity of bits of CSI fed back by the terminal device in each subframe for feeding back the periodic CSI is not constant, quantities of bits of UCI fed back by the terminal device in different subframes are different. The access network device allocates multiple uplink channels to the terminal device in advance, and before the terminal device feeds back UCI, the access network device sends dynamic indication information to the terminal device. The dynamic indication information specifies an uplink channel on which the terminal device feeds back the UCI.

As a quantity of uplink channels allocated by the access network device to the terminal device in advance increases continuously, a quantity of bits of the dynamic indication information delivered by the access network device increases continuously, leading to relatively large consumption of downlink channel resources. In addition, a capacity of the uplink channel specified by the access network device for the terminal device by using the dynamic indication information does not meet a size of the UCI. As a result, utilization of the uplink channel is relatively low or UCI bits are discarded.

SUMMARY

Embodiments of the present invention provide an uplink control information sending method, an uplink control information receiving method, an apparatus, and a system, so as to reduce consumption of downlink channel resources, thereby increasing utilization of an uplink channel or preventing losses of UCI bits.

A first aspect provides an uplink control information sending method, including:
  receiving, by a terminal device, channel indication information from an access network device on a physical control channel;
  determining, by the terminal device, a channel resource set of N channel resource sets, where N is a positive integer greater than or equal to 2, the N channel resource sets are preconfigured by the access network device for the terminal device, and each of the N channel resource sets includes at least two channel resources;
  determining, by the terminal device, a channel resource that is in the channel resource set and that is indicated by the channel indication information; and
  sending, by the terminal device, uplink control information UCI to the access network device on the channel resource.

With reference to the first aspect, in a first possible implementation of the first aspect, before the determining, by the terminal device, a channel resource set of N channel resource sets, the method further includes:
  determining, by the terminal device, a type of the UCI; and
  the determining, by the terminal device, a channel resource set of N channel resource sets includes: determining, by the terminal device, the channel resource set that is of the N channel resource sets and that matches the type of the UCI.

With reference to the first possible implementation of the first aspect, in a second possible implementation of the first aspect, the type of the UCI includes a first type and a second type, and N=2, where
  a first type of UCI includes channel state information CSI and hybrid automatic repeat request-acknowledgment HARQ-ACK information, and a channel resource included in one of the N channel resource sets is used to send the first type of UCI; and
  a second type of UCI includes HARQ-ACK information but not CSI, and a channel resource included in the other of the N channel resource sets is used to send the second type of UCI.

With reference to the first aspect, in a third possible implementation of the first aspect, before the determining, by the terminal device, a channel resource set of N channel resource sets as a first channel resource set, the method further includes:
  determining, by the terminal device, a size of the UCI; and
  the determining, by the terminal device, a channel resource set of N channel resource sets as a first channel resource set includes:
  determining, by the terminal device, the channel resource set that is of the N channel resource sets and that matches the size K of the UCI as the first channel resource set.

With reference to the third possible implementation of the first aspect, in a fourth possible implementation of the first aspect, the determining, by the terminal device, the channel resource set that is of the N channel resource sets and that matches the size K of the UCI as the first channel resource set includes:
  determining, by the terminal device, a capacity range corresponding to each of the N channel resource sets; and
  determining, by the terminal device, a channel resource set of the N channel resource sets as the first channel resource set, so that the size K of the UCI meets $R_{min} \leq K \leq R_{max}$ where a capacity range of the channel resource set is $[R_{min}, R_{max}]$, $R_{min}$ is a minimum value of a capacity of the channel resource set, and $R_{max}$ is a maximum value of the capacity of the channel resource set.

With reference to any one of the first aspect or the first to the fourth possible implementations of the first aspect, in a fifth possible implementation of the first aspect, quantities of channel resources included in the N channel resource sets are the same.

With reference to any one of the first aspect or the first to the fifth possible implementations of the first aspect, in a sixth possible implementation of the first aspect, at least one of the N channel resource sets includes at least two channel resources having different formats.

With reference to any one of the first aspect or the first to the fifth possible implementations of the first aspect, in a seventh possible implementation of the first aspect, at least one of the N channel resource sets includes at least two channel resources having a same format but different channel capacities.

With reference to any one of the first aspect or the first to the seventh possible implementations of the first aspect, in an eighth possible implementation of the first aspect, before the receiving, by a terminal device, channel indication information from an access network device on a physical control channel, the method further includes:
  receiving, by the terminal device, configuration information of the N channel resource sets from the access network device by using higher layer signaling, where configuration information of the N channel resource sets corresponding to the different terminal devices is different.

A second aspect provides an uplink control information receiving method, including:
  sending, by an access network device, channel indication information to a terminal device on a physical control channel;
  preconfiguring, by the access network device, N channel resource sets for the terminal device, so that the terminal device determines a channel resource set of the N channel resource sets as a first channel resource set, and determines a channel resource that is in the first channel resource set and that is indicated by the channel indication information, where N is a positive integer greater than or equal to 2, and each of the N channel resource sets includes at least two channel resources; and
  receiving, by the access network device, uplink control information UCI sent by the terminal device on the channel resource.

With reference to the second aspect, in a first possible implementation of the second aspect, quantities of channel resources included in the N channel resource sets are the same.

With reference to the second aspect, in a second possible implementation of the second aspect, at least one of the N channel resource sets includes at least two channel resources having different formats.

With reference to the second aspect, in a third possible implementation of the second aspect, at least one of the N channel resource sets includes at least two channel resources having a same format but different channel capacities.

With reference to any one of the second aspect or the first to the third possible implementations of the second aspect, in a fourth possible implementation of the second aspect, before the sending, by an access network device, channel indication information to a terminal device on a physical control channel, the method further includes:
  sending, by the access network device, configuration information of the N channel resource sets to the terminal device by using higher layer signaling, where configuration information of the N channel resource sets corresponding to the different terminal devices is different.

A third aspect provides an uplink control information sending method, including:
  receiving, by a terminal device, channel indication information from an access network device on a physical control channel;
  determining, by the terminal device, a first channel resource of N channel resources according to the channel indication information, where N is a positive integer greater than or equal to 2, and the N channel resources are preconfigured by the access network device for the terminal device;
  increasing or decreasing, by the terminal device, the first channel resource to obtain a second channel resource; and
  sending, by the terminal device, uplink control information UCI to the access network device on the second channel resource.

With reference to the third aspect, in a first possible implementation of the third aspect, the N channel resources correspond to different channel capacities;
  before the increasing or decreasing, by the terminal device, the first channel resource to obtain a second channel resource, the method further includes: determining, by the terminal device, a size of the UCI; and
  the increasing or decreasing, by the terminal device, the first channel resource to obtain a second channel resource includes:
  if a channel capacity corresponding to the first channel resource is greater than the size of the UCI, decreasing, by the terminal device, the first channel resource to obtain the second channel resource; or
  if a channel capacity corresponding to the first channel resource is less than the size of the UCI, increasing, by the terminal device, the first channel resource to obtain the second channel resource.

With reference to the first possible implementation of the third aspect, in a second possible implementation of the third aspect, the decreasing, by the terminal device, the first channel resource to obtain the second channel resource includes:
   decreasing, by the terminal device, the channel capacity of the first channel resource by k basic channel elements to obtain the second channel resource, so that the size $R_a$ of the UCI meets $R_b-(k+1)R_0<R_a\leq R_b-kR_0$, where $R_b$ indicates the channel capacity of the first channel resource, and $R_o$ indicates a size of the basic channel element.

With reference to the second possible implementation of the third aspect, in a third possible implementation of the third aspect, a subcarrier whose frequency is the highest in the k basic channel elements is adjacent to a subcarrier whose frequency is the lowest in the first channel resource; or
   a subcarrier whose frequency is the lowest in the k basic channel elements is adjacent to a subcarrier whose frequency is the highest in the first channel resource.

With reference to the first possible implementation of the third aspect, in a fourth possible implementation of the third aspect, the increasing, by the terminal device, the first channel resource to obtain the second channel resource includes:
   increasing, by the terminal device, the channel capacity of the first channel resource by k basic channel elements, so that the size $R_a$ of the UCI meets $R_b+(k-1)R_0<R_a\leq R_b+kR_0$, where $R_b$ indicates the channel capacity of the first channel resource, and $R_o$ indicates a size of the basic channel element.

With reference to the fourth possible implementation of the third aspect, in a fifth possible implementation of the third aspect, a subcarrier whose frequency is the highest in the k basic channel elements is adjacent to a subcarrier whose frequency is the lowest in the first channel resource; or
   a subcarrier whose frequency is the lowest in the k basic channel elements is adjacent to a subcarrier whose frequency is the highest in the first channel resource.

With reference to any one of the third aspect or the first to the fifth possible implementations of the third aspect, in a sixth possible implementation of the third aspect, the UCI includes at least one of HARQ-ACK information of the terminal device for received downlink data or channel state information CSI generated by the terminal device.

With reference to any one of the third aspect or the first to the sixth possible implementations of the third aspect, in a seventh possible implementation of the third aspect, before the receiving, by a terminal device, channel indication information from an access network device on a physical control channel, the method further includes:
   receiving, by the terminal device, configuration information of the N channel resources from the access network device by using higher layer signaling, where configuration information of the N channel resource sets corresponding to the different terminal devices is different.

A fourth aspect provides an uplink control information receiving method, including:
   sending, by an access network device, channel indication information to a terminal device on a physical control channel, so that the terminal device determines a first channel resource of N channel resources according to the channel indication information, and increases or decreases the first channel resource to obtain a second channel resource, where N is a positive integer greater than or equal to 2, and the N channel resources are preconfigured by the access network device for the terminal device; and
   receiving, by the access network device, uplink control information UCI sent by the terminal device on the second channel resource.

With reference to the fourth aspect, in a first possible implementation of the fourth aspect, the UCI includes at least one of HARQ-ACK information of the terminal device for received downlink data or channel state information CSI generated by the terminal device.

With reference to the fourth aspect or the first possible implementation of the fourth aspect, in a second possible implementation of the fourth aspect, before the sending, by an access network device, channel indication information to a terminal device on a physical control channel, the method further includes:
   sending, by the access network device, configuration information of the N channel resources to the terminal device by using higher layer signaling, where configuration information of the N channel resource sets corresponding to the different terminal devices is different.

A fifth aspect provides a terminal device, including:
   a first receiving unit, configured to receive channel indication information from an access network device on a physical control channel;
   a first processing unit, configured to: determine a channel resource set of N channel resource sets as a first channel resource set, where N is a positive integer greater than or equal to 2, the N channel resource sets are preconfigured by the access network device for the terminal device, and each of the N channel resource sets includes at least two channel resources; and determine a channel resource that is in the first channel resource set and that is indicated by the channel indication information; and
   a first sending unit, configured to send uplink control information UCI to the access network device on the channel resource.

With reference to the fifth aspect, in a first possible implementation of the fifth aspect, the first processing unit is further configured to determine a type of the UCI; and
   the first processing unit is specifically configured to determine the channel resource set that is of the N channel resource sets and that matches the type of the UCI as the first channel resource set.

With reference to the first possible implementation of the fifth aspect, in a second possible implementation of the fifth aspect, the type of the UCI includes a first type and a second type, and N=2, where
   a first type of UCI includes channel state information CSI and hybrid automatic repeat request-acknowledgment HARQ-ACK information, and a channel resource included in one of the N channel resource sets is used to send the first type of UCI; and
   a second type of UCI includes HARQ-ACK information but not CSI, and a channel resource included in the other of the N channel resource sets is used to send the second type of UCI.

With reference to the fifth aspect, in a third possible implementation of the fifth aspect, the first processing unit is further configured to determine a size of the UCI; and
   the first processing unit is specifically configured to determine the channel resource set that is of the N channel resource sets and that matches the size K of the UCI as the first channel resource set.

With reference to the third possible implementation of the fifth aspect, in a fourth possible implementation of the fifth aspect, the first processing unit is specifically configured to: determine a capacity range corresponding to each of the N channel resource sets; and determine a channel resource set of the N channel resource sets as the first channel resource set, so that the size K of the UCI meets $R_{min} \leq K \leq R_{max}$, where a capacity range of the channel resource set is $[R_{min}, R_{max}]$, $R_{min}$ is a minimum value of a capacity of the channel resource set, and $R_{max}$ is a maximum value of the capacity of the channel resource set.

With reference to any one of the fifth aspect or the first to the fourth possible implementations of the fifth aspect, in a fifth possible implementation of the fifth aspect, quantities of channel resources included in the N channel resource sets are the same.

With reference to any one of the fifth aspect or the first to the fifth possible implementations of the fifth aspect, in a sixth possible implementation of the fifth aspect, at least one of the N channel resource sets includes at least two channel resources having different formats.

With reference to any one of the fifth aspect or the first to the fifth possible implementations of the fifth aspect, in a seventh possible implementation of the fifth aspect, at least one of the N channel resource sets includes at least two channel resources having a same format but different channel capacities.

With reference to any one of the fifth aspect or the first to the seventh possible implementations of the fifth aspect, in an eighth possible implementation of the fifth aspect, the first receiving unit is further configured to receive configuration information of the N channel resource sets from the access network device by using higher layer signaling, where configuration information of the N channel resource sets corresponding to the different terminal devices is different.

A sixth aspect provides an access network device, including:
  a second sending unit, configured to send channel indication information to a terminal device on a physical control channel;
  a second processing unit, configured to preconfigure N channel resource sets for the terminal device, so that the terminal device determines a channel resource set of the N channel resource sets as a first channel resource set, and determines a channel resource that is in the first channel resource set and that is indicated by the channel indication information, where N is a positive integer greater than or equal to 2, and each of the N channel resource sets includes at least two channel resources; and
  a second receiving unit, configured to receive uplink control information UCI sent by the terminal device on the channel resource.

With reference to the sixth aspect, in a first possible implementation of the sixth aspect, quantities of channel resources included in the N channel resource sets are the same.

With reference to the sixth aspect, in a second possible implementation of the sixth aspect, at least one of the N channel resource sets includes at least two channel resources having different formats.

With reference to the sixth aspect, in a third possible implementation of the sixth aspect, at least one of the N channel resource sets includes at least two channel resources having a same format but different channel capacities.

With reference to any one of the sixth aspect or the first to the third possible implementations of the sixth aspect, in a fourth possible implementation of the sixth aspect, the second sending unit is further configured to send configuration information of the N channel resource sets to the terminal device by using higher layer signaling, where configuration information of the N channel resource sets corresponding to the different terminal devices is different.

A seventh aspect provides a terminal device, including:
  a third receiving unit, configured to receive channel indication information from an access network device on a physical control channel;
  a third processing unit, configured to: determine a first channel resource of N channel resources according to the channel indication information, where N is a positive integer greater than or equal to 2, and the N channel resources are preconfigured by the access network device for the terminal device; and increase or decrease the first channel resource to obtain a second channel resource; and
  a third sending unit, configured to send uplink control information UCI to the access network device on the second channel resource.

With reference to the seventh aspect, in a first possible implementation of the seventh aspect, the N channel resources correspond to different channel capacities;
  the third processing unit is further configured to determine a size of the UCI; and
  the third processing unit is specifically configured to: if a channel capacity corresponding to the first channel resource is greater than the size of the UCI, decrease the first channel resource to obtain the second channel resource; or if a channel capacity corresponding to the first channel resource is less than the size of the UCI, increase the first channel resource to obtain the second channel resource.

With reference to the first possible implementation of the seventh aspect, in a second possible implementation of the seventh aspect, the third processing unit is specifically configured to decrease the channel capacity of the first channel resource by k basic channel elements to obtain the second channel resource, so that the size $R_a$ of the UCI meets $R_b-(k+1)R_0 < R_a \leq R_b-kR_0$, where $R_b$ indicates the channel capacity of the first channel resource, and $R_o$ indicates a size of the basic channel element.

With reference to the second possible implementation of the seventh aspect, in a third possible implementation of the seventh aspect, a subcarrier whose frequency is the highest in the k basic channel elements is adjacent to a subcarrier whose frequency is the lowest in the first channel resource; or
  a subcarrier whose frequency is the lowest in the k basic channel elements is adjacent to a subcarrier whose frequency is the highest in the first channel resource.

With reference to the first possible implementation of the seventh aspect, in a fourth possible implementation of the seventh aspect, the third processing unit is specifically configured to increase the channel capacity of the first channel resource by k basic channel elements, so that the size $R_a$ of the UCI meets $R_b+(k-1)R_0 < R_a \leq R_b+kR_0$, where $R_b$ indicates the channel capacity of the first channel resource, and $R_o$ indicates a size of the basic channel element.

With reference to the fourth possible implementation of the seventh aspect, in a fifth possible implementation of the seventh aspect, a subcarrier whose frequency is the highest in the k basic channel elements is adjacent to a subcarrier whose frequency is the lowest in the first channel resource; or a subcarrier whose frequency is the lowest in the k basic channel elements is adjacent to a subcarrier whose frequency is the highest in the first channel resource.

With reference to any one of the seventh aspect or the first to the fifth possible implementations of the seventh aspect, in a sixth possible implementation of the seventh aspect, the UCI includes at least one of HARQ-ACK information of the terminal device for received downlink data or channel state information CSI generated by the terminal device.

With reference to any one of the seventh aspect or the first to the sixth possible implementations of the seventh aspect, in a seventh possible implementation of the seventh aspect, the third receiving unit is further configured to receive configuration information of the N channel resources from the access network device by using higher layer signaling, where configuration information of the N channel resource sets corresponding to the different terminal devices is different.

An eighth aspect provides an access network device, including:

a fourth sending unit, configured to send channel indication information to a terminal device on a physical control channel, so that the terminal device determines a first channel resource of N channel resources according to the channel indication information, and increases or decreases the first channel resource to obtain a second channel resource, where N is a positive integer greater than or equal to 2, and the N channel resources are preconfigured by the access network device for the terminal device; and a fourth receiving unit, configured to receive uplink control information UCI sent by the terminal device on the second channel resource.

With reference to the eighth aspect, in a first possible implementation of the eighth aspect, the UCI includes at least one of HARQ-ACK information of the terminal device for received downlink data or channel state information CSI generated by the terminal device.

With reference to the eighth aspect or the first possible implementation of the eighth aspect, in a second possible implementation of the eighth aspect, the fourth sending unit is further configured to send configuration information of the N channel resources to the terminal device by using higher layer signaling, where configuration information of the N channel resource sets corresponding to the different terminal devices is different.

A ninth aspect provides an uplink control information sending and receiving system, including the terminal device according to any one of the fifth aspect or the first to the eighth possible implementations of the fifth aspect, and the access network device according to any one of the sixth aspect or the first to the fourth possible implementations of the sixth aspect.

A tenth aspect provides an uplink control information sending and receiving system, including the terminal device according to any one of the seventh aspect or the first to the seventh possible implementations of the seventh aspect, and the access network device according to any one of the eighth aspect or the first or the second possible implementation of the eighth aspect.

According to the uplink control information sending method, the uplink control information receiving method, and the apparatus that are provided in the embodiments of the present invention, the access network device sends the configuration information of the at least two channel resource sets to the terminal device, where each channel resource set includes at least two channel resources. This is equivalent to that all channel resources allocated by the access network device to the terminal device are grouped, and each group is equivalent to one channel resource set. The terminal device first determines the first channel resource set of the multiple channel resource sets, and then determines the channel resource in the first channel resource set according to the channel indication information. Different channel resources may be determined at different times in a subframe according to same channel indication information, while in the prior art, only one channel resource can be determined at different times in a subframe according to same channel indication information. As a quantity of channel resources increases continuously, a quantity of bits that need to be added to the channel indication information in the embodiments of the present invention is less than that in the prior art, reducing consumption of downlink channel resources by the channel indication information in a delivery process.

BRIEF DESCRIPTION OF DRAWINGS

To describe the technical solutions in the embodiments of the present invention more clearly, the following briefly describes the accompanying drawings required for describing the embodiments. Apparently, the accompanying drawings in the following description show some embodiments of the present invention, and persons of ordinary skill in the art may still derive other drawings from these accompanying drawings without creative efforts.

FIG. 10 is a flowchart of an uplink control information receiving method according to another embodiment of the present invention;

FIG. 11 is a structural diagram of a terminal device according to an embodiment of the present invention;

FIG. 12 is a structural diagram of an access network device according to an embodiment of the present invention;

DESCRIPTION OF EMBODIMENTS

To make the objectives, technical solutions, and advantages of the embodiments of the present invention clearer, the following clearly describes the technical solutions in the embodiments of the present invention with reference to the accompanying drawings in the embodiments of the present invention. Apparently, the described embodiments are some but not all of the embodiments of the present invention. All other embodiments obtained by persons of ordinary skill in the art based on the embodiments of the present invention without creative efforts shall fall within the protection scope of the present invention.

Figure 1:
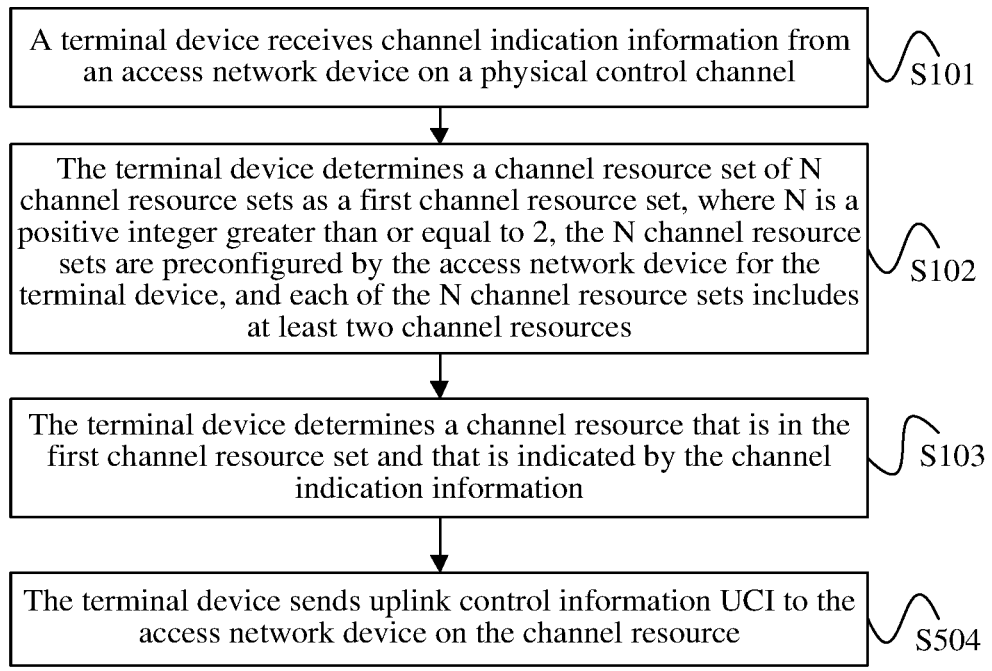
FIG. 1 is a flowchart of an uplink control information sending method according to an embodiment of the present invention.

FIG. 1 is a flowchart of an uplink control information sending method according to an embodiment of the present invention. In this embodiment of the present invention, the uplink control information sending method is provided for a case in which as a quantity of uplink channels increases continuously, a quantity of bits of channel indication information delivered by an access network device increases continuously, leading to relatively large consumption of downlink channel resources. Specific steps of the method are as follows.

Step S101: A terminal device receives channel indication information from an access network device on a physical control channel.

This embodiment of the present invention relates to an access network device and a terminal device in an LTE system. The access network device is specifically a base station, and the access network device sends downlink data to a same terminal device by using at least one of multiple carriers. For downlink data on each carrier, the terminal device separately performs acknowledgment and generates HARQ-ACK information. In addition, the access network device sends a reference signal to the terminal device by using each carrier. The terminal device obtains channel state information CSI corresponding to each carrier by detecting the reference signal on each carrier. The access network device feeds back uplink control information UCI to the access network device on an uplink channel. The UCI includes at least one of the HARQ-ACK information or the channel state information CSI.

Before the access network device feeds back the uplink control information UCI to the access network device on the uplink channel, the terminal device receives, on the physical control channel, the channel indication information sent by the access network device. The physical control channel is specifically a physical downlink control channel (PDCCH) and an enhanced physical downlink control channel (EPDCCH). Information borne on the physical control channel is dynamically configured information. That is, the channel indication information is borne on the physical control channel as dynamically configured information, and is sent by the access network device to the terminal device.

Step S102: The terminal device determines a channel resource set of N channel resource sets as a first channel resource set, where N is a positive integer greater than or equal to 2, the N channel resource sets are preconfigured by the access network device for the terminal device, and each of the N channel resource sets includes at least two channel resources.

In this embodiment of the present invention, step S101 may be performed first and then step S102 may be performed, or step S102 may be performed first and then step S101 may be performed. The access network device preconfigures the N channel resource sets for the terminal device, where N is a positive integer greater than or equal to 2, and each of the N channel resource sets includes at least two channel resources. The terminal device determines a channel resource set of the N channel resource sets as the first channel resource set. Specifically, determining the channel resource set of the N channel resource sets as the first channel resource set may be according to a type or size of the UCI fed back by the terminal device to the access network device. The type of the UCI may be specifically distinguished by using specific content included in the UCI, and the size of the UCI may be specifically measured by using a quantity of bits of the UCI or an amount of UCI.

Step S103: The terminal device determines a channel resource that is in the first channel resource set and that is indicated by the channel indication information.

After the first channel resource set is determined in step S102, the terminal device determines the channel resource that is in the first channel resource set and that is indicated by the channel indication information. Specifically, the channel resource indicated by the channel indication information is a channel resource in the first channel resource set. For example, the first channel resource set includes four channel resources: a channel resource a, a channel resource b, a channel resource c, and a channel resource d. It is predefined that channel indication information 00 indicates the channel resource a, channel indication information 01 indicates the channel resource b, channel indication information 10 indicates the channel resource c, and channel indication information 11 indicates the channel resource d. According to an indication of the channel indication information, the channel resource may be determined in the first channel resource set.

Step S104: The terminal device sends uplink control information UCI to the access network device on the channel resource.

The terminal device sends the uplink control information UCI to the access network device on the channel resource determined in step S103. That is, the channel resource is used as an uplink channel to bear the uplink control information UCI, and is used to send the UCI to the access network device.

In this embodiment of the present invention, the access network device sends configuration information of the at least two channel resource sets to the terminal device, where each channel resource set includes at least two channel resources. This is equivalent to that all channel resources allocated by the access network device to the terminal device are grouped, and each group is equivalent to one channel resource set. The terminal device first determines the first channel resource set of the multiple channel resource sets, and then determines the channel resource in the first channel resource set according to the channel indication information. Different channel resources may be determined at different times in a subframe according to same channel indication information, while in the prior art, only one channel resource can be determined at different times in a subframe according to same channel indication information. As a quantity of channel resources increases continuously, a quantity of bits that need to be added to the channel indication information in this embodiment of the present invention is less than that in the prior art, reducing consumption of downlink channel resources by the channel indication information in a delivery process.

Figure 2:
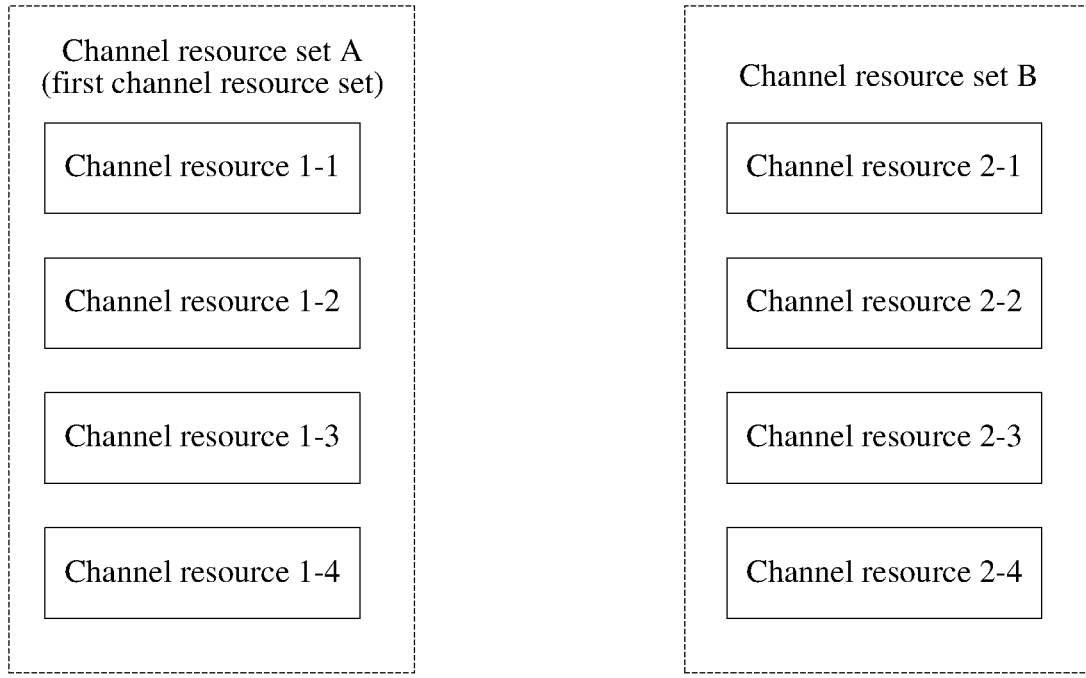
FIG. 2 is a schematic diagram of a channel resource according to an embodiment of the present invention.

FIG. 2 is a schematic diagram of a channel resource according to an embodiment of the present invention. Based on the foregoing embodiment, before the determining, by the terminal device, a channel resource set of N channel resource sets as a first channel resource set, the method further includes: determining, by the terminal device, a type of the UCI. The determining, by the terminal device, a channel resource set of N channel resource sets as a first channel resource set includes: determining, by the terminal device, the channel resource set that is of the N channel resource sets and that matches the type of the UCI as the first channel resource set.

The type of the UCI includes a first type and a second type, and N=2. A first type of UCI includes channel state information CSI and hybrid automatic repeat request-acknowledgment HARQ-ACK information, and a channel resource included in one of the N channel resource sets is used to send the first type of UCI. A second type of UCI includes HARQ-ACK information but not CSI, and a channel resource included in the other of the N channel resource sets is used to send the second type of UCI.

The terminal device determines the type of the UCI. For each downlink carrier for the terminal device, there is corresponding configuration information for sending periodic CSI. Specifically, the configuration information includes a sending period of the periodic CSI and a subframe offset value for sending the periodic CSI in the period. The user equipment (UE) may determine, by using a sending period of periodic CSI on each downlink carrier and a subframe offset value for sending the periodic CSI that are configured by the base station, whether the periodic CSI needs to be sent on at least one carrier in a current uplink subframe, so as to determine whether a type of UCI that needs to be fed back in the current uplink subframe is the first type of UCI or the second type of UCI.

In this embodiment of the present invention, the first type of UCI includes the channel state information CSI and the hybrid automatic repeat request-acknowledgment HARQ-ACK information, the second type of UCI includes HARQ-ACK information but not CSI, and N=2. The determining a channel resource set of N channel resource sets as a first channel resource set may be specifically performed according to a correspondence between a type of a channel resource set and a type of UCI. Specifically, the correspondence is implemented in two manners. In a first manner, when preconfiguring the N channel resource sets for the terminal device, the access network device predefines a type that is of UCI and that matches each channel resource set. For example, whether a channel resource in each channel resource set is used to send the first type of UCI or the second type of UCI. In a second manner, when preconfiguring the N channel resource sets for the terminal device, the access network device sends control signaling to the terminal device, to indicate a type that is of UCI and that matches each channel resource set. For example, whether a channel resource in each channel resource set is used to send the first type of UCI or the second type of UCI.

As shown in FIG. 2, the configuration information in the foregoing embodiment includes two channel resource sets: a channel resource set A and a channel resource set B. Each channel resource set matches a specific different type of UCI. In this embodiment of the present invention, it is assumed that the channel resource set A matches the first type of UCI, and the channel resource set B matches the second type of UCI. That is, each of channel resources such as a channel resource 1-1, a channel resource 1-2, a channel resource 1-3, and a channel resource 1-4 in the channel resource set A can bear the channel state information CSI and the hybrid automatic repeat request-acknowledgment HARQ-ACK information, and each of channel resources such as a channel resource 2-1, a channel resource 2-2, a channel resource 2-3, and a channel resource 2-4 in the channel resource set B can be used to bear the hybrid automatic repeat request-acknowledgment HARQ-ACK information but cannot be used to bear the CSI.

The terminal device determines, according to the type of the UCI, the channel resource set matching the type of the UCI as the first channel resource set. A specific determining process is: If the UCI includes the CSI, the terminal device determines the channel resource set A matching the type of the UCI as the first channel resource set; or if the UCI does not include the CSI, the terminal device determines the channel resource set B as the first channel resource set.

In addition, when the first channel resource set is predefined as the channel resource set A, the channel indication information 00 indicates the channel resource 1-1, the channel indication information 01 indicates the channel resource 1-2, the channel indication information 10 indicates the channel resource 1-3, and the channel indication information 11 indicates the channel resource 1-4. When the first channel resource set is predefined as the channel resource set B, the channel indication information 00 indicates the channel resource 2-1, the channel indication information 01 indicates the channel resource 2-2, the channel indication information 10 indicates the channel resource 2-3, and the channel indication information 11 indicates the channel resource 2-4.

If the determined first channel resource set is the channel resource set A, and a channel resource identifier carried in the channel indication information is a binary number 01, a channel resource determined by the terminal device in the channel resource set A according to the channel indication information is the channel resource 1-2. If the determined first channel resource set is the channel resource set B, a channel resource determined by the terminal device in the channel resource set B according to the same channel indication information is the channel resource 2-2. That is, same channel indication information may be used to indicate different target channel resources at different times in a subframe.

This embodiment of the present invention specifically provides the method for determining, by the terminal device according to the type of the UCI, the channel resource set matching the type of the UCI of the two channel resource sets as the first channel resource set.

Figure 3:
FIG. 3 is a schematic diagram of a channel resource according to another embodiment of the present invention.

FIG. 3 is a schematic diagram of a channel resource according to another embodiment of the present invention. Before the determining, by the terminal device, a channel resource set of N channel resource sets as a first channel resource set, the method further includes: determining, by the terminal device, a size of the UCI. The determining, by the terminal device, a channel resource set of N channel resource sets as a first channel resource set includes: determining, by the terminal device, the channel resource set that is of the N channel resource sets and that matches the size K of the UCI as the first channel resource set.

The terminal device determines the size of the UCI. For each downlink carrier for the terminal device, there is corresponding configuration information for sending periodic CSI. Specifically, the configuration information includes a sending period of the periodic CSI, a subframe offset value for sending the periodic CSI in the period, a reporting mode of the periodic CSI, and the like. The UE may determine, by using configuration information that is for periodic CSI on each downlink carrier and that is configured by the base station, a quantity of bits for reporting the periodic CSI on each carrier in a current uplink subframe and reported content, so as to determine a size K of UCI that needs to be fed back in the current uplink subframe.

The determining, by the terminal device, the channel resource set that is of the N channel resource sets and that matches the size K of the UCI as the first channel resource set includes: determining, by the terminal device, a capacity range corresponding to each of the N channel resource sets; and determining, by the terminal device, a channel resource set of the N channel resource sets as the first channel resource set, so that the size K of the UCI meets $R_{min} \leq K \leq R_{max}$, where a capacity range of the channel resource set is $[R_{min}, R_{max}]$, $R_{min}$ is a minimum value of a capacity of the channel resource set, and $R_{max}$ is a maximum value of the capacity of the channel resource set.

As shown in FIG. 3, the access network device preconfigures four channel resource sets for the terminal device: a channel resource set A, a channel resource set B, a channel resource set C, and a channel resource set D. The access network device sends the configuration information to the terminal device. The configuration information includes a capacity range corresponding to each of the four channel resource sets, and the channel resource sets correspond to different capacity ranges. The capacity range corresponding to each channel resource set refers to a quantity of bits of UCI that can be sent on channel resources of each channel resource set. For example, a capacity range corresponding to the channel resource set A is $[R_{1,min}, R_{1,max}]$, where $R_{1,min}$ is a minimum value of a capacity of the channel resource set A, and $R_{1,max}$ is a maximum value of the capacity of the channel resource set A. Similarly, a capacity range corresponding to the channel resource set B is $[R_{2,min}, R_{2,max}]$, a capacity range corresponding to the channel resource set C is $[R_{3,min}, R_{3,max}]$, and a capacity range corresponding to the channel resource set D is $[R_{4,min}, R_{4,max}]$. The size of the UCI may be measured by using the quantity of bits of the UCI or the amount of the UCI. Specifically, each of the foregoing four capacity ranges represents a range of the quantity of bits. If the quantity K of bits of the UCI meets $R_{2,min} \leq K \leq R_{2,max}$, that is, the quantity of bits of the UCI is in a range of $[R_{2,min}, R_{2,max}]$, the terminal device determines that the first channel resource set is the channel resource set B.

Alternatively, the access network device sends the configuration information to the terminal device. The configuration information includes capacity information corresponding to each of the four channel resource sets, and the channel resource sets correspond to different capacity information. For example, as the first channel resource set, the channel resource set A is corresponding to capacity information $R_1$, and a channel capacity corresponding to each channel resource in the channel resource set A is $R_1$; as the second channel resource set, the channel resource set B is corresponding to capacity information $R_2$, and a channel capacity corresponding to each channel resource in the channel resource set B is $R_2$; as the third channel resource set, the channel resource set C is corresponding to capacity information $R_3$, and a channel capacity corresponding to each channel resource in the channel resource set C is $R_3$; as the fourth channel resource set, the channel resource set D is corresponding to capacity information $R_4$, and a channel capacity corresponding to each channel resource in the channel resource set D is $R_4$; $R_1 < R_2 < R_3 < R_4$. If the quantity $R_a$ of bits of the UCI meets $R_{i-1} < R_a \leq R_i$, where $1 \leq i \leq 4$, the terminal device determines that the first channel resource set is the $i^{th}$ channel resource set. Specifically, for example, if the quantity $R_a$ of bits of the UCI meets $R_1 < R_a \leq R_2$, the terminal device determines that the first channel resource set is the second channel resource set, that is, the channel resource set B.

In addition, when the first channel resource set is the channel resource set A, the channel indication information 00 indicates the channel resource 1-1, the channel indication information 01 indicates the channel resource 1-2, the channel indication information 10 indicates the channel resource 1-3, and the channel indication information 11 indicates the channel resource 1-4. When the first channel resource set is the channel resource set B, the channel indication information 00 indicates the channel resource 2-1, the channel indication information 01 indicates the channel resource 2-2, the channel indication information 10 indicates the channel resource 2-3, and the channel indication information 11 indicates the channel resource 2-4. When the first channel resource set is the channel resource set C, the channel indication information 00 indicates a channel resource 3-1, the channel indication information 01 indicates a channel resource 3-2, the channel indication information 10 indicates a channel resource 3-3, and the channel indication information 11 indicates a channel resource 3-4. When the first channel resource set is the channel resource set D, the channel indication information 00 indicates a channel resource 4-1, the channel indication information 01 indicates a channel resource 4-2, the channel indication information 10 indicates a channel resource 4-3, and the channel indication information 11 indicates a channel resource 4-4.

If the first channel resource set is the channel resource set B, and a channel resource identifier carried in the channel indication information is a binary number 01, a channel resource determined by the terminal device in the channel resource set B according to the channel indication information is the channel resource 2-2. If the first channel resource set is the channel resource set D, a channel resource determined by the terminal device in the channel resource set D according to the same channel indication information is the channel resource 4-2. That is, same channel indication information may be used to indicate different channel resources at different times in a subframe.

In this embodiment of the present invention, quantities of channel resources included in the N channel resource sets are the same. As shown in FIG. 2 and FIG. 3, all the channel resource sets include a same quantity of channel resources. In addition, all the channel resource sets may alternatively include different quantities of channel resources.

Figure 17:
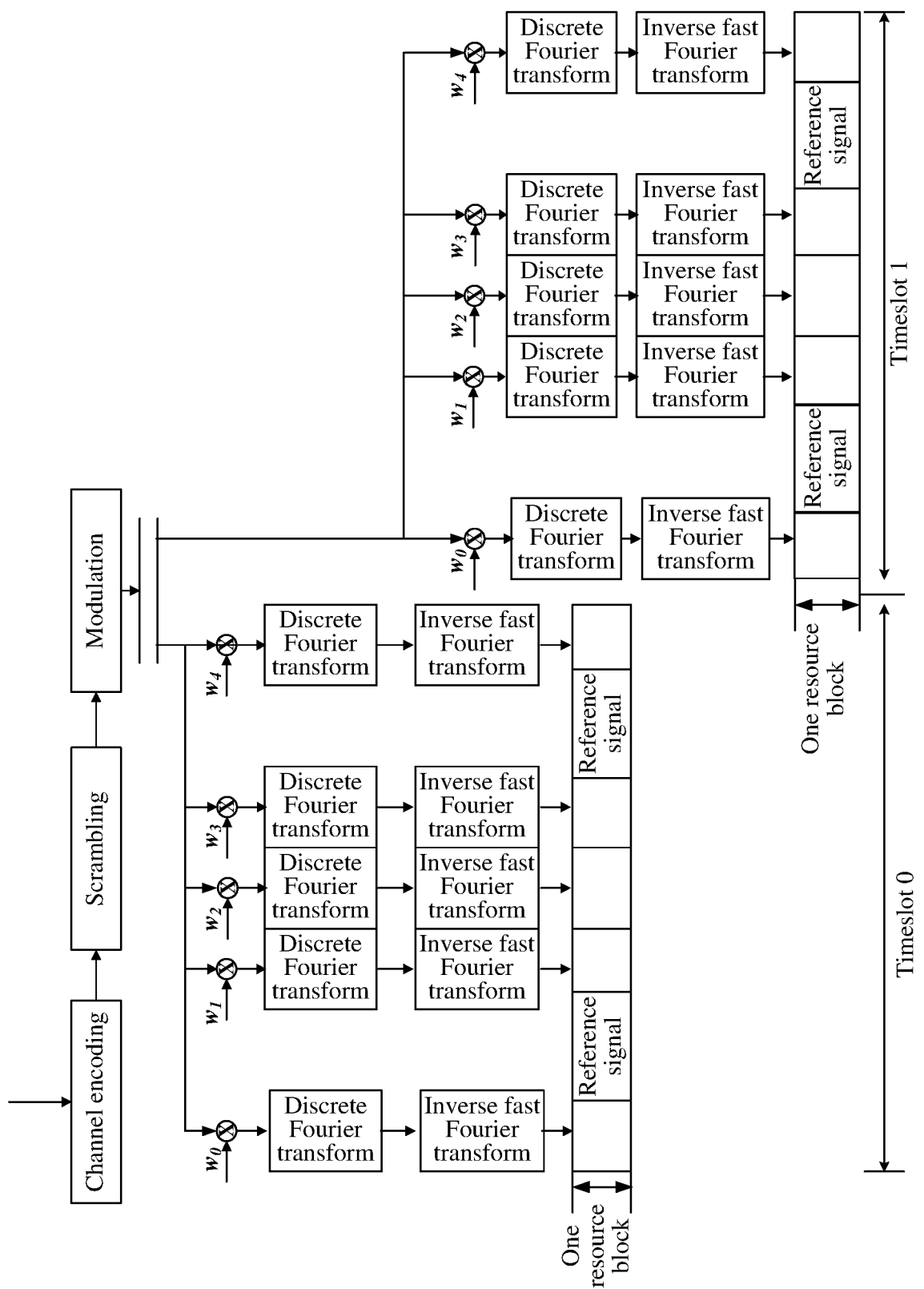
FIG. 17 is a schematic diagram of a format of a channel resource according to an embodiment of the present invention.

At least one of the N channel resource sets includes at least two channel resources having different formats. A channel resource set includes channel resources having at least two different formats. For example, the four channel resources in the channel resource set A may have two formats, three formats, or four formats. FIG. 17 is a schematic diagram of a format of a channel resource according to an embodiment of the present invention. The format of the channel resource may include, but is not limited to, the following formats.

First: physical uplink control channel format 3. A symbol obtained after an original bit is channel coded and a symbol obtained after the original bit is modulated are separately placed in two timeslots of one subframe. In this way, there are 12 modulated symbols in each timeslot, and the 12 modulated symbols are placed on 12 consecutive subcarriers on one time-domain symbol in one timeslot, that is, occupy 12 subcarriers on one time-domain symbol of one resource block (RB). Then, for each timeslot, spreading is performed by using an orthogonal cover code (OCC) sequence w having a length of 5 in a time domain. One timeslot occupies five time-domain symbols in one RB. Different UEs may perform code division multiplexing on one RB by using different OCCs. Two remaining symbols are used to bear a reference signal (RS). After that, discrete Fourier transform (DFT) precoding and inverse fast Fourier transform (IFFT) are performed on the spread bit. In the case of a normal CP, a sending structural diagram of physical uplink control channel (PUCCH) format 3 is shown in FIG. 17: In one resource block, the reference signal is specifically a pilot portion, and a portion other than the reference signal is a data portion.

Second: a first format based on PUCCH format 3. The channel resource in PUCCH format 3 is extended to occupy N (N>1) RBs. Using two RBs as an example, 12 subcarriers in each timeslot are extended to 24 subcarriers in each timeslot. An original bit is channel coded and scrambled separately, and then obtained bits are modulated. Obtained results are separately placed on each subcarrier of two RBs in one subframe. Then, for each timeslot, spreading is performed by using an orthogonal cover code (OCC) sequence w having a length of 5 in a time domain. One timeslot occupies five time-domain symbols. Two remaining symbols are used to bear a reference signal (RS). A mapping location of a demodulation reference signal is the same as that in PUCCH format 3. Then, on each symbol, DFT precoding in a length of 24 and inverse fast Fourier transform (IFFT) are performed on all spread data in the two RBs. A solution of performing spreading in 3 RBs or more RBs is similar, provided that extension is performed in a frequency domain. In addition to RM encoding, original bit information in this format may also be encoded by using a convolutional code, for example, a tail biting convolutional code (TBCC).

Third: a second format based on PUCCH format 3. The channel resource occupies N (N>1) RBs, and a format of each RB is the same as that in PUCCH format 3. Using two RBs as an example, 12 subcarriers in each timeslot are extended to 24 subcarriers in each timeslot. An original bit is channel coded and scrambled separately, and then obtained bits are modulated. Obtained results are separately placed on each subcarrier of two RBs in one subframe. Then, for each timeslot, spreading is performed by using an orthogonal cover code (OCC) sequence w having a length of 5 in a time domain. One timeslot occupies five time-domain symbols. Two remaining symbols are used to bear a reference signal (RS). A mapping location of a demodulation reference signal is the same as that in PUCCH format 3. Then, on each symbol, DFT precoding in a length of 12 is separately performed on spread data in each of the two RBs. A result of each DFT precoding is mapped to inverse fast Fourier transform IFFT on a carrier in a frequency domain, to complete the IFFT transform. A solution of performing spreading in 3 RBs or more RBs is similar, provided that extension is performed in the frequency domain. In addition to RM encoding, original bit information in this format may also be encoded by using a convolutional code, for example, a tail biting convolutional code (TBCC).

Fourth: a third format based on PUCCH format 3. The channel resource occupies N (N≥1) RBs. In a possible manner, a DFT-S-OFDM transmission mode is used in the channel resource. An original bit is channel coded and modulated, and obtained results are separately placed on K symbols in one subframe. For each of the K symbols, in a time domain, spreading is performed by using an orthogonal cover code OCC having a length of M (M<5). Each to-be-sent modulated symbol occupies M time-domain symbols, and each timeslot includes two symbols used to bear a reference signal (Reference Signal, RS for short). Then, a mapping location of a demodulation reference signal is the same as that in PUCCH format 3. DFT precoding and inverse fast Fourier transform (Inverse Fast Fourier Transform, IFFT for short) are performed on the spread bit. In another possible manner, a DFT-S-OFDM transmission mode is used in each of the N RBs. An original bit is channel coded and modulated, and obtained results are separately placed on K symbols in one subframe. For each of the K symbols, in a time domain, spreading is performed by using an orthogonal cover code OCC having a length of M (M<5). Each to-be-sent modulated symbol occupies M time-domain symbols, and each timeslot includes two symbols used to bear a reference signal (RS). A mapping location of a demodulation reference signal is the same as that in PUCCH format 3. In addition to RM encoding, original bit information in this format may also be encoded by using a convolutional code, for example, a tail biting convolutional code (TBCC).

Fourth: a fourth format based on PUCCH format 3. The channel resource occupies N (N≥1) RBs. In a possible manner, a DFT-S-OFDM transmission mode is used in the channel resource. An original bit is channel coded and modulated, and obtained results are separately placed in two timeslots of one subframe. P (P≥2) coded and modulated symbols may be placed on each symbol. In a time domain, P different orthogonal cover codes OCCs each having a length of 5 are separately used to perform spreading on the P coded and modulated symbols on each symbol, and the P spread signals are superimposed. Each to-be-sent modulated symbol occupies 5 time-domain symbols, and each timeslot includes two symbols used to bear a reference signal (RS). A mapping location of a demodulation reference signal is the same as that in PUCCH format 3. Then, DFT precoding and inverse fast Fourier transform (IFFT) are performed on the spread bit. In another possible manner, a DFT-S-OFDM transmission mode is used in each of the N RBs. An original bit is channel coded and modulated, and obtained results are separately placed in two timeslots of one subframe. P (P≥2) coded and modulated symbols may be placed on each symbol. In a time domain, P different orthogonal cover codes OCCs each having a length of 5 are separately used to perform spreading on the P coded and modulated symbols on each symbol, and the P spread signals are superimposed. Each to-be-sent modulated symbol occupies 5 time-domain symbols, and each timeslot includes two symbols used to bear a reference signal (RS). A mapping location of a demodulation reference signal is the same as that in PUCCH format 3. In addition to RM encoding, original bit information in this format may also be encoded by using a convolutional code, for example, a tail biting convolutional code (TBCC).

Fifth: a physical uplink shared channel (PUSCH)-based format. The channel resource occupies N(N≥1) RBs. For each physical resource block (PRB), in the case of a normal CP, a demodulation reference signal occupies an intermediate symbol in each PRB; in the case of an extended CP, a demodulation reference signal occupies the third symbol in each PRB. After original information to be fed back is channel coded and modulated, the information is mapped to a location other than that of a demodulation reference signal in a first PUCCH channel resource, and then DFT precoding and inverse fast Fourier transform (IFFT) are performed on the information. Original bit information in this format may be encoded by using a convolutional code, for example, a tail biting convolutional code (TBCC). In the case of the normal CP, a sending structural diagram of the PUSCH-based format is shown in FIG. 17: In one resource block, the reference signal is specifically a pilot portion, and a portion other than the reference signal is a data portion.

At least one of the N channel resource sets includes at least two channel resources having a same format but different channel capacities. For example, the channel resource 1-1 and the channel resource 1-2 in the channel resource set A have a same format but different channel capacities.

The UCI further includes scheduling request information SR.

Before the receiving, by a terminal device, channel indication information from an access network device on a physical control channel, the method further includes: receiving, by the terminal device, configuration information of the N channel resource sets from the access network device by using higher layer signaling, where configuration information of the N channel resource sets corresponding to the different terminal devices is different.

Before the receiving, by a terminal device, channel indication information from an access network device on a physical control channel, the terminal device receives the configuration information sent by the access network device. The configuration information includes the N channel resource sets, and configuration information of the N channel resource sets corresponding to the different terminal devices is different.

This embodiment of the present invention specifically provides the method for determining, by the terminal device according to the size of the UCI, the channel resource set matching the size of the UCI of the at least two channel resource sets as the first channel resource set.

Figure 4:
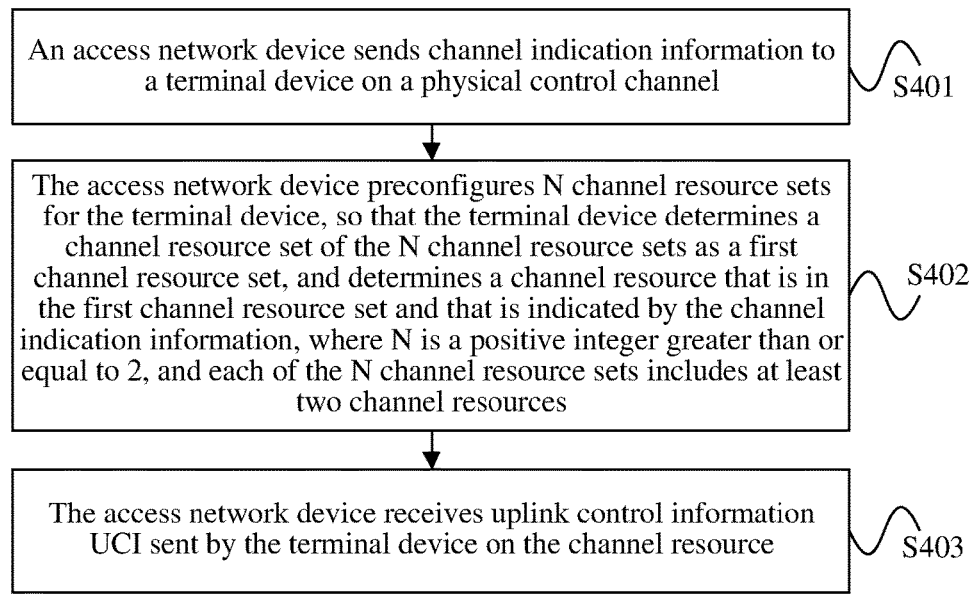
FIG. 4 is a flowchart of an uplink control information receiving method according to another embodiment of the present invention.

FIG. 4 is a flowchart of an uplink control information receiving method according to another embodiment of the present invention. In this embodiment of the present invention, the uplink control information sending method is provided for a case in which as a quantity of uplink channels increases continuously, a quantity of bits of channel indication information delivered by an access network device increases continuously, leading to relatively large consumption of downlink channel resources. Specific steps of the method are as follows:

Step S401: An access network device sends channel indication information to a terminal device on a physical control channel.

This embodiment of the present invention relates to an access network device and a terminal device in an LTE system. The access network device is specifically a base station, and the access network device sends downlink data to a same terminal device by using at least one of multiple carriers. For downlink data on each carrier, the terminal device separately performs acknowledgment and generates HARQ-ACK information. In addition, the access network device sends a reference signal to the terminal device by using each carrier. The terminal device obtains channel state information CSI corresponding to each carrier by detecting the reference signal on each carrier. The access network device feeds back uplink control information UCI to the access network device on an uplink channel. The UCI includes at least one of the HARQ-ACK information or the channel state information CSI.

Before the access network device feeds back the uplink control information UCI to the access network device on the uplink channel, the access network device sends the channel indication information to the terminal device on the physical control channel. The physical control channel is specifically a physical downlink control channel (PDCCH) and an enhanced physical downlink control channel (EPDCCH). Information borne on the physical control channel is dynamically configured information. That is, the channel indication information is borne on the physical control channel as dynamically configured information, and is sent by the access network device to the terminal device.

Step S402: The access network device preconfigures N channel resource sets for the terminal device, so that the terminal device determines a channel resource set of the N channel resource sets as a first channel resource set, and determines a channel resource that is in the first channel resource set and that is indicated by the channel indication information, where N is a positive integer greater than or equal to 2, and each of the N channel resource sets includes at least two channel resources.

In this embodiment of the present invention, step S401 may be performed first and then step S402 may be performed, or step S402 may be performed first and then step S401 may be performed. The access network device preconfigures the N channel resource sets for the terminal device, where N is a positive integer greater than or equal to 2, and each of the N channel resource sets includes at least two channel resources. The terminal device determines a channel resource set of the N channel resource sets as the first channel resource set. Specifically, determining the channel resource set of the N channel resource sets as the first channel resource set may be according to a type or size of the UCI fed back by the terminal device to the access network device. The type of the UCI may be specifically distinguished by using specific content included in the UCI, and the size of the UCI may be specifically measured by using a quantity of bits of the UCI or an amount of UCI. After the first channel resource set is determined, the terminal device determines the channel resource that is in the first channel resource set and that is indicated by the channel indication information. Specifically, the channel resource indicated by the channel indication information is a channel resource in the first channel resource set. For example, the first channel resource set includes four channel resources: a channel resource a, a channel resource b, a channel resource c, and a channel resource d. It is predefined that channel indication information 00 indicates the channel resource a, channel indication information 01 indicates the channel resource b, channel indication information 10 indicates the channel resource c, and channel indication information 11 indicates the channel resource d. According to an indication of the channel indication information, the channel resource may be determined in the first channel resource set.

Step S403: The access network device receives uplink control information UCI sent by the terminal device on the channel resource.

The access network device receives the uplink control information UCI sent by the terminal device on the determined channel resource. That is, the channel resource is used as the uplink channel to bear the uplink control information UCI.

In this embodiment of the present invention, the access network device sends configuration information of the at least two channel resource sets to the terminal device, where each channel resource set includes at least two channel resources. This is equivalent to that all channel resources allocated by the access network device to the terminal device are grouped, and each group is equivalent to one channel resource set. The terminal device first determines the first channel resource set of the multiple channel resource sets, and then determines the channel resource in the first channel resource set according to the channel indication information. Different channel resources may be determined at different times in a subframe according to same channel indication information, while in the prior art, only one channel resource can be determined at different times in a subframe according to same channel indication information. As a quantity of channel resources increases continuously, a quantity of bits that need to be added to the channel indication information in this embodiment of the present invention is less than that in the prior art, reducing consumption of downlink channel resources by the channel indication information in a delivery process.

Based on the foregoing embodiment, quantities of channel resources included in the N channel resource sets are the same. As shown in FIG. 2 and FIG. 3, all the channel resource sets include a same quantity of channel resources. In addition, all the channel resource sets may alternatively include different quantities of channel resources.

At least one of the N channel resource sets includes at least two channel resources having different formats. A channel resource set includes channel resources having at least two different formats. For example, four channel resources in a channel resource set A may have two formats, three formats, or four formats. A format of the channel resource is shown in FIG. 17. The five formats detailed in the foregoing embodiment are not described herein again.

At least one of the N channel resource sets includes at least two channel resources having a same format but different channel capacities. For example, a channel resource 1-1 and a channel resource 1-2 in the channel resource set A have a same format but different channel capacities.

The UCI further includes scheduling request information SR.

Before the sending, by an access network device, channel indication information to a terminal device on a physical control channel, the method further includes: sending, by the access network device, configuration information of the N channel resource sets to the terminal device by using higher layer signaling, where configuration information of the N channel resource sets corresponding to the different terminal devices is different.

Before the sending, by an access network device, channel indication information to a terminal device on a physical control channel, the access network device sends the configuration information to the terminal device. The configuration information includes the N channel resource sets, and configuration information of the N channel resource sets corresponding to the different terminal devices is different.

This embodiment of the present invention specifically provides the method for determining, by the terminal device according to the type or the size of the UCI, the channel resource set matching the type or the size of the UCI of the multiple channel resource sets as the first channel resource set.

Figure 5:
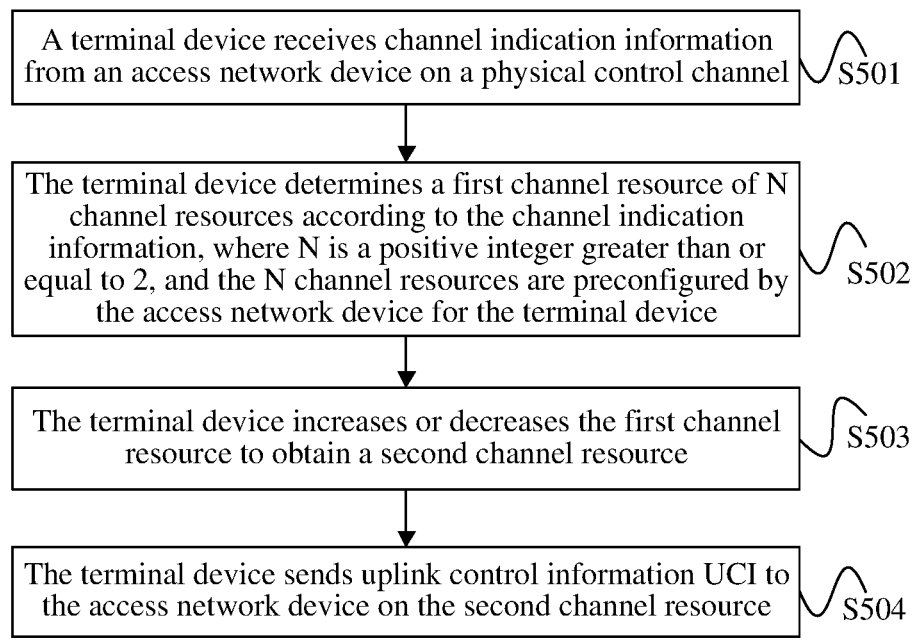
FIG. 5 is a flowchart of an uplink control information sending method according to another embodiment of the present invention.

FIG. 5 is a flowchart of an uplink control information sending method according to another embodiment of the present invention. In this embodiment of the present invention, the uplink control information sending method is provided for a case in which a capacity of an uplink channel specified by an access network device for the terminal device by using channel indication information does not meet a size of UCI, leading to relatively low utilization of the uplink channel or losses of UCI bits. Specific steps of the method are as follows:

Step S501: A terminal device receives channel indication information from an access network device on a physical control channel.

The terminal device receives, on the physical control channel, the channel indication information sent by the access network device. The physical control channel is specifically a physical downlink control channel (PDCCH) and an enhanced physical downlink control channel (EPDCCH). Information borne on the physical control channel is dynamically configured information. That is, the channel indication information is borne on the physical control channel as dynamically configured information, and is sent by the access network device to the terminal device. The channel indication information is specifically channel indication information.

Step S502: The terminal device determines a first channel resource of N channel resources according to the channel indication information, where N is a positive integer greater than or equal to 2, and the N channel resources are preconfigured by the access network device for the terminal device.

If the access network device allocates four channel resources to the terminal device, which are specifically a channel resource a, a channel resource b, a channel resource c, and a channel resource d, and it is predefined that channel indication information 00 indicates the channel resource a, channel indication information 01 indicates the channel resource b, channel indication information 10 indicates the channel resource c, and channel indication information 11 indicates the channel resource d, the first channel resource may be determined in the four channel resources according to an indication of the channel indication information. For example, it is determined, according to the indication of the channel indication information, that the first channel resource is the channel resource b.

Step S503: The terminal device increases or decreases the first channel resource to obtain a second channel resource.

The N channel resources correspond to different channel capacities. Before the increasing or decreasing, by the terminal device, the first channel resource to obtain a second channel resource, the method further includes: determining, by the terminal device, a size of the UCI. The increasing or decreasing, by the terminal device, the first channel resource to obtain a second channel resource includes: if a channel capacity corresponding to the first channel resource is greater than the size of the UCI, decreasing, by the terminal device, the first channel resource to obtain the second channel resource; or if a channel capacity corresponding to the first channel resource is less than the size of the UCI, increasing, by the terminal device, the first channel resource to obtain the second channel resource.

Step S504: The terminal device sends uplink control information UCI to the access network device on the second channel resource.

The first channel resource is modified to obtain the second channel resource in step S503, so that a capacity corresponding to the second channel resource matches the size of the uplink control information UCI. The terminal device sends the UCI to the access network device on the second channel resource.

In this embodiment of the present invention, one of the at least two channel resources is determined as the first channel resource by using the channel indication information; the first channel resource is increased or decreased according to capacity information corresponding to the first channel resource and the size of the uplink control information UCI generated by the terminal device, to obtain the second channel resource; and the terminal device sends the UCI to the access network device on the second channel resource, so that a capacity corresponding to the second channel resource matches the size of the UCI. That is, when the first channel resource is greater than the size of the uplink control information UCI, the first channel resource is decreased to increase utilization of the uplink channel; when the first channel resource is less than the size of the uplink control information UCI, the first channel resource is increased to prevent discarding of UCI bits.

Figure 6:
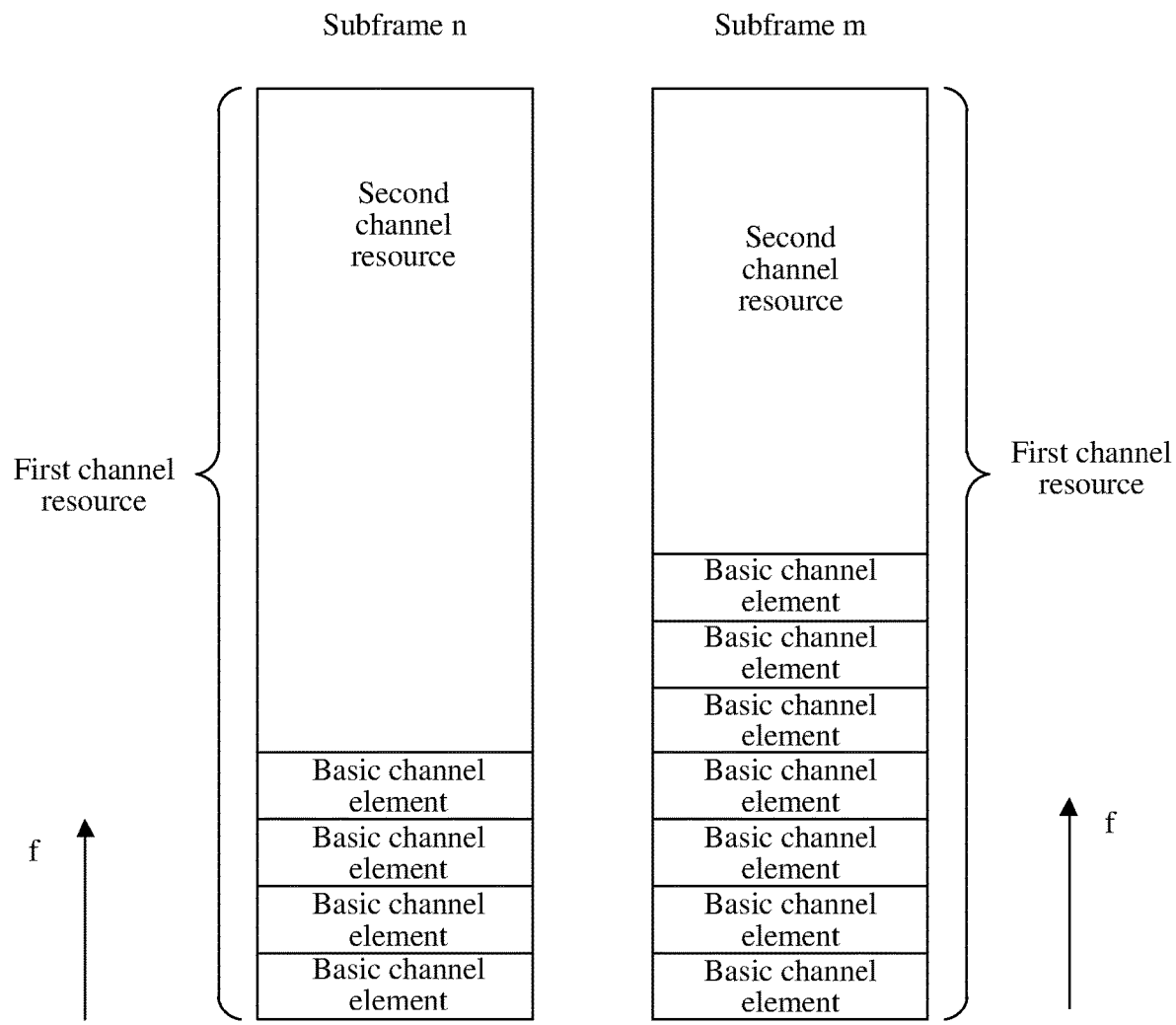
FIG. 6 is a schematic diagram of a channel resource according to still another embodiment of the present invention.
Figure 7:
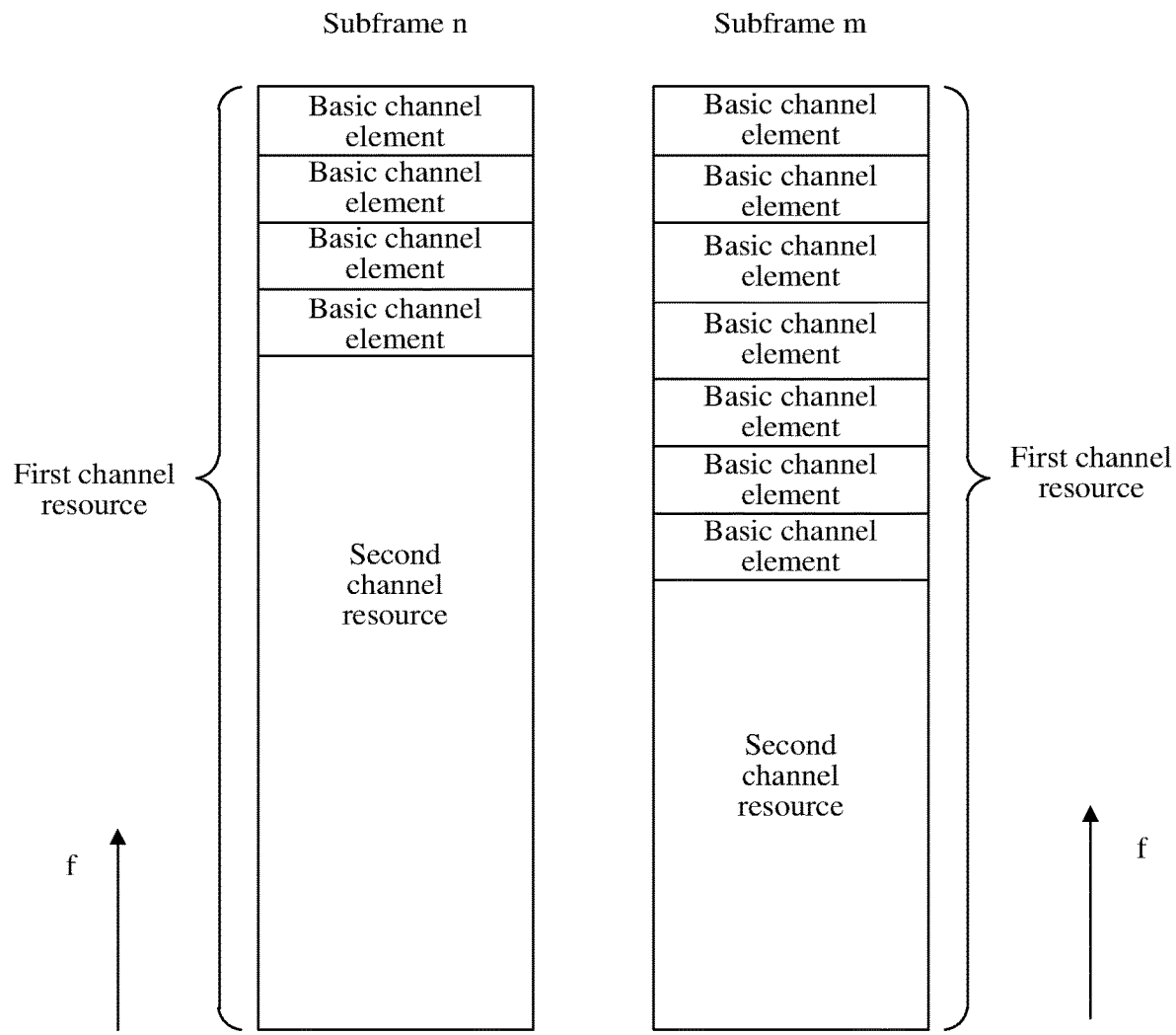
FIG. 7 is a schematic diagram of a channel resource according to yet another embodiment of the present invention.

FIG. 6 is a schematic diagram of a channel resource according to still another embodiment of the present invention. FIG. 7 is a schematic diagram of a channel resource according to yet another embodiment of the present invention. Based on the foregoing embodiment, the decreasing, by the terminal device, the first channel resource to obtain the second channel resource includes: decreasing, by the terminal device, the channel capacity of the first channel resource by k basic channel elements to obtain the second channel resource, so that the size $R_a$ of the UCI meets $R_b-(k+1)R_0 < R_a \leq R_b-kR_0$, where $R_b$ indicates the channel capacity of the first channel resource, and $R_o$ indicates a size of the basic channel element.

In this embodiment of the present invention, the channel capacity of the first channel resource is represented by $R_b$, and the size of the UCI is represented by $R_a$. For example, at a time in a subframe n, if the capacity corresponding to the first channel resource determined by the terminal device by using the channel indication information is greater than the size of the UCI, that is, $R_b > R_a$, the channel capacity of the first channel resource is decreased. Specifically, the channel capacity of the first channel resource is in a unit of a basic channel element, and it is preset that the size of the basic channel element is $R_o$. A difference between $R_b$ and $R_a$ is divided by $R_o$, and then an obtained result is rounded up to obtain a quantity k of basic channel elements that need to be subtracted, so that the size $R_a$ of the UCI meets $R_b-(k+1)R_0 < R_a \leq R_b-kR_0$. In different subframes, sizes of the UCI are different. Therefore, in different subframes, different quantities of basic channel elements need to be subtracted from first channel resources having a same size. For example, at the time in the subframe n, four basic channel elements need to be subtracted from the first channel resource; at a time in a subframe m, seven basic channel elements need to be subtracted from the first channel resource.

A subcarrier whose frequency is the highest in the k basic channel elements is adjacent to a subcarrier whose frequency is the lowest in the first channel resource; or a subcarrier whose frequency is the lowest in the k basic channel elements is adjacent to a subcarrier whose frequency is the highest in the first channel resource.

As shown in FIG. 6, a frequency increases in a direction of an arrow f. Specifically, the subcarrier whose frequency is the highest in the k basic channel elements is adjacent to the subcarrier whose frequency is the lowest in the first channel resource. That is, the first channel resource may be decreased from a low frequency band of the first channel resource.

As shown in FIG. 7, a frequency increases in a direction of an arrow f. Specifically, the subcarrier whose frequency is the lowest in the k basic channel elements is adjacent to the subcarrier whose frequency is the highest in the first channel resource. That is, the first channel resource may be decreased from a high frequency band of the first channel resource.

Figure 8:
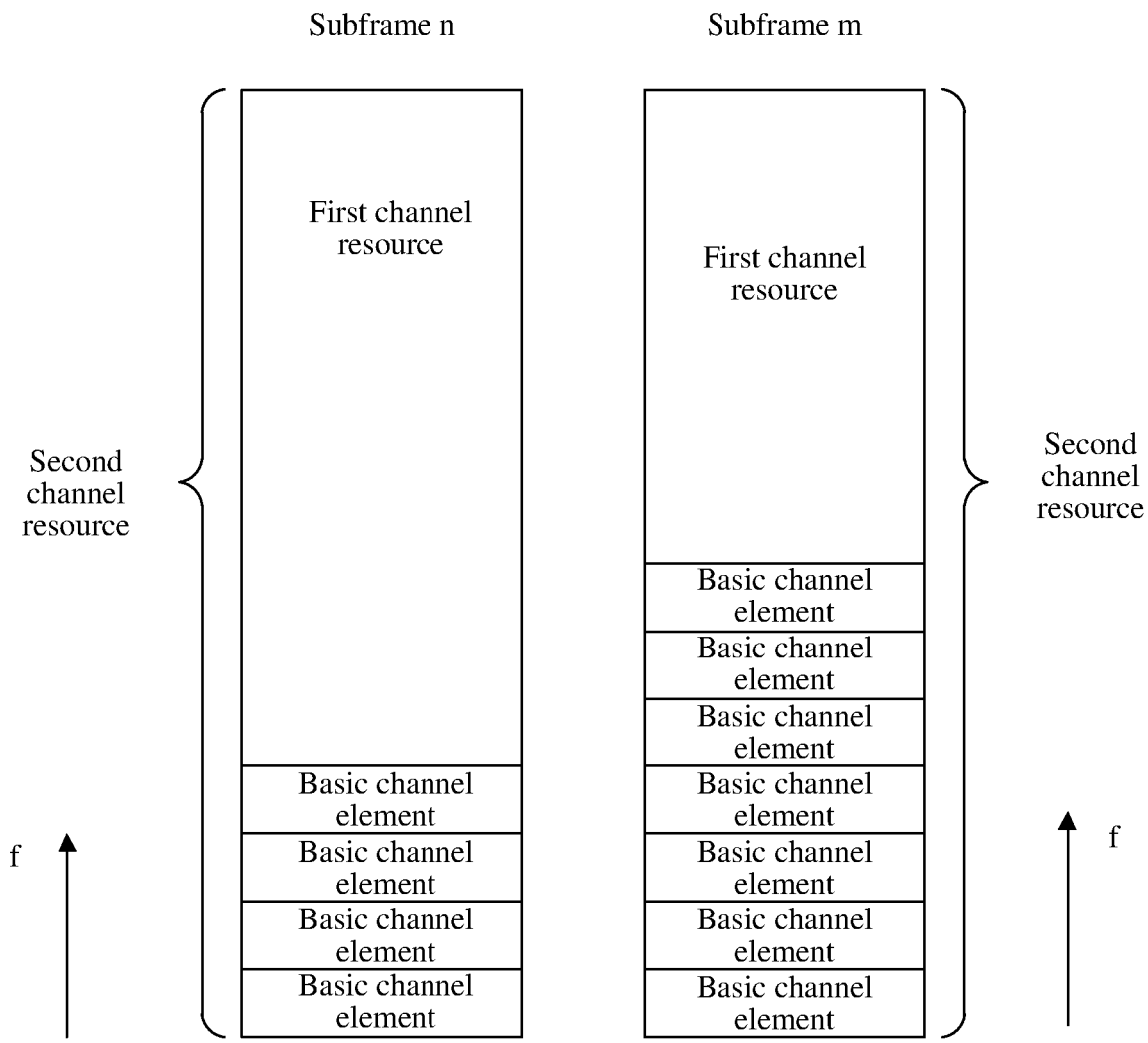
FIG. 8 is a schematic diagram of a channel resource according to still yet another embodiment of the present invention.
Figure 9:
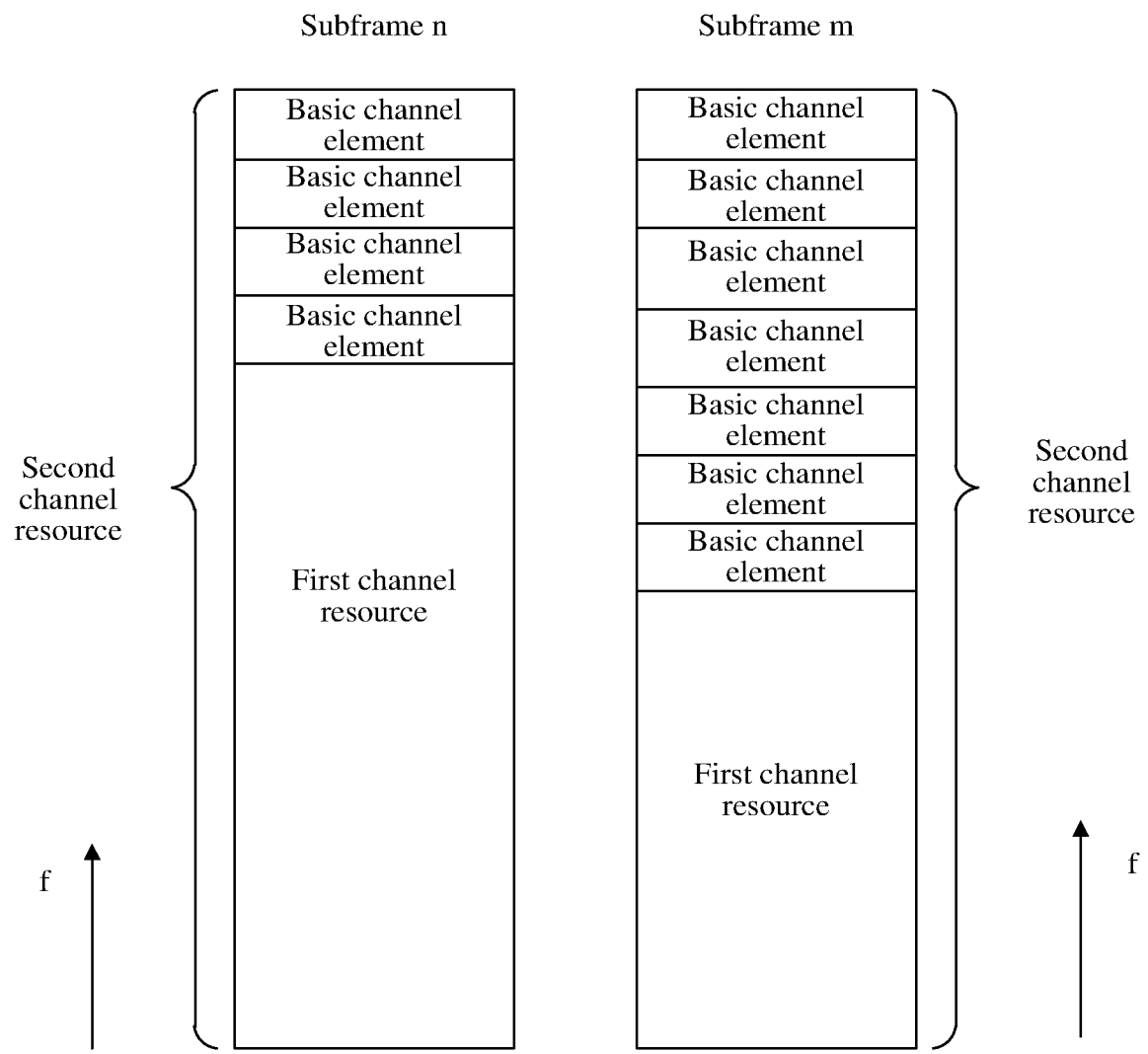
FIG. 9 is a schematic diagram of a channel resource according to a further embodiment of the present invention.

FIG. 8 is a schematic diagram of a channel resource according to still yet another embodiment of the present invention. FIG. 9 is a schematic diagram of a channel resource according to a further embodiment of the present invention. Based on the foregoing embodiment, the increasing, by the terminal device, the first channel resource to obtain the second channel resource includes: increasing, by the terminal device, the channel capacity of the first channel resource by k basic channel elements, so that the size $R_a$ of the UCI meets $R_b+(k-1)R_0 < R_a \leq R_b+kR_0$, where $R_b$ the channel capacity of the first channel resource, and $R_o$ indicates a size of the basic channel element.

In this embodiment of the present invention, the channel capacity of the first channel resource is represented by $R_b$, and the size of the UCI is represented by $R_a$. For example, at a time in a subframe n, if the capacity corresponding to the first channel resource determined by the terminal device by using the channel indication information is less than the size of the UCI, that is, $R_b < R_a$, the channel capacity of the first channel resource is increased. Specifically, the channel capacity of the first channel resource is in a unit of a basic channel element, and it is preset that the size of the basic channel element is $R_o$. A difference between $R_a$ and $R_b$ is divided by $R_o$, and then an obtained result is rounded up to obtain a quantity k of basic channel elements that need to be added, so that the size $R_a$ of the UCI meets $R_b+(k-1)R_0 < R_a \leq R_b+kR_0$. In different subframes, sizes of the UCI are different. Therefore, in different subframes, different quantities of basic channel elements need to be added to first channel resources having a same size. For example, at the time in the subframe n, four basic channel elements need to be added to the first channel resource; at a time in a subframe m, seven basic channel elements need to be added to the first channel resource.

A subcarrier whose frequency is the highest in the k basic channel elements is adjacent to a subcarrier whose frequency is the lowest in the first channel resource; or a subcarrier whose frequency is the lowest in the k basic channel elements is adjacent to a subcarrier whose frequency is the highest in the first channel resource.

As shown in FIG. 8, a frequency increases in a direction of an arrow f. Specifically, the subcarrier whose frequency is the highest in the k basic channel elements is adjacent to the subcarrier whose frequency is the lowest in the first channel resource. That is, the first channel resource may be increased from a low frequency band of the first channel resource.

As shown in FIG. 9, a frequency increases in a direction of an arrow f. Specifically, the subcarrier whose frequency is the lowest in the k basic channel elements is adjacent to the subcarrier whose frequency is the highest in the first channel resource. That is, the first channel resource may be increased from a high frequency band of the first channel resource.

In this embodiment of the present invention, the UCI includes at least one of HARQ-ACK information of the terminal device for received downlink data or channel state information CSI generated by the terminal device.

The UCI further includes scheduling request information SR.

Before the receiving, by a terminal device, channel indication information from an access network device on a physical control channel, the method further includes: receiving, by the terminal device, configuration information of the N channel resources from the access network device by using higher layer signaling, where configuration information of the N channel resource sets corresponding to the different terminal devices is different.

Before the receiving, by a terminal device, channel indication information from an access network device on a physical control channel, the terminal device further receives the configuration information sent by the access network device by using higher layer signaling. The configuration information includes the N channel resources, and configuration information of the N channel resource sets corresponding to the different terminal devices is different.

In this embodiment of the present invention, the first channel resource is increased or decreased in a unit of a basic channel element, to obtain the second channel resource, so that the capacity corresponding to the second channel resource matches the size of the UCI. That is, when the first channel resource is greater than the size of the uplink control information UCI, the first channel resource is decreased to increase utilization of the uplink channel; when the first channel resource is less than the size of the uplink control information UCI, the first channel resource is increased to prevent discarding of UCI bits.

FIG. 10 is a flowchart of an uplink control information receiving method according to another embodiment of the present invention. In this embodiment of the present invention, the uplink control information sending method is provided for a case in which a capacity of an uplink channel specified by an access network device for the terminal device by using channel indication information does not meet a size of UCI, leading to relatively low utilization of the uplink channel or discarding of UCI bits. Specific steps of the method are as follows:

Step S1001: An access network device sends channel indication information to a terminal device on a physical control channel, so that the terminal device determines a first channel resource of N channel resources according to the channel indication information, and increases or decreases the first channel resource to obtain a second channel resource, where N is a positive integer greater than or equal to 2, and the N channel resources are preconfigured by the access network device for the terminal device.

The terminal device receives, on the physical control channel, the channel indication information sent by the access network device. The physical control channel is specifically a physical downlink control channel (PDCCH) and an enhanced physical downlink control channel (EPDCCH). Information borne on the physical control channel is dynamically configured information. That is, the channel indication information is borne on the physical control channel as dynamically configured information, and is sent by the access network device to the terminal device. The channel indication information is specifically channel indication information. If the access network device allocates four channel resources to the terminal device, which are specifically a channel resource a, a channel resource b, a channel resource c, and a channel resource d, and it is predefined that channel indication information 00 indicates the channel resource a, channel indication information 01 indicates the channel resource b, channel indication information 10 indicates the channel resource c, and channel indication information 11 indicates the channel resource d, the first channel resource may be determined in the four channel resources according to an indication of the channel indication information. For example, it is determined, according to the indication of the channel indication information, that the first channel resource is the channel resource b. The N channel resources correspond to different channel capacities. Before the increasing or decreasing, by the terminal device, the first channel resource to obtain a second channel resource, the method further includes: determining, by the terminal device, a size of the UCI. The increasing or decreasing, by the terminal device, the first channel resource to obtain a second channel resource includes: if a channel capacity corresponding to the first channel resource is greater than the size of the UCI, decreasing, by the terminal device, the first channel resource to obtain the second channel resource; or if a channel capacity corresponding to the first channel resource is less than the size of the UCI, increasing, by the terminal device, the first channel resource to obtain the second channel resource.

Step S1002: The access network device receives uplink control information UCI sent by the terminal device on the second channel resource.

The first channel resource is modified to obtain the second channel resource, so that a capacity corresponding to the second channel resource matches the size of the uplink control information UCI. The access network device receives the UCI sent by the terminal device on the second channel resource.

In this embodiment of the present invention, the UCI includes at least one of HARQ-ACK information of the terminal device for received downlink data or channel state information CSI generated by the terminal device.

The UCI further includes scheduling request information SR.

Before the sending, by an access network device, channel indication information to a terminal device on a physical control channel, the method further includes: sending, by the access network device, configuration information of the N channel resources to the terminal device by using higher layer signaling, where configuration information of the N channel resource sets corresponding to the different terminal devices is different.

Before the sending, by an access network device, channel indication information to a terminal device on a physical control channel, the access network device sends the configuration information to the terminal device by using the higher layer signaling. The configuration information includes the N channel resources, and configuration information of the N channel resource sets corresponding to the different terminal devices is different.

In this embodiment of the present invention, one of the at least two channel resources is determined as the first channel resource by using the channel indication information; the first channel resource is increased or decreased according to capacity information corresponding to the first channel resource and the size of the uplink control information UCI generated by the terminal device, to obtain the second channel resource; and the terminal device sends the UCI to the access network device on the second channel resource, so that a capacity corresponding to the second channel resource matches the size of the UCI. That is, when the first channel resource is greater than the size of the uplink control information UCI, the first channel resource is decreased to increase utilization of the uplink channel; when the first channel resource is less than the size of the uplink control information UCI, the first channel resource is increased to prevent discarding of UCI bits.

FIG. 11 is a structural diagram of a terminal device according to an embodiment of the present invention. The terminal device provided in this embodiment of the present invention may perform the processing procedure provided in the embodiment of the uplink control information sending method. As shown in FIG. 11, the terminal device 110 includes a first receiving unit 111, a first processing unit 112, and a first sending unit 113. The first receiving unit 111 is configured to receive channel indication information from an access network device on a physical control channel. The first processing unit 112 is configured to: determine a channel resource set of N channel resource sets as a first channel resource set, where N is a positive integer greater than or equal to 2, the N channel resource sets are preconfigured by the access network device for the terminal device, and each of the N channel resource sets includes at least two channel resources; and determine a channel resource that is in the first channel resource set and that is indicated by the channel indication information. The first sending unit 113 is configured to send uplink control information UCI to the access network device on the channel resource.

The first processing unit 112 in this embodiment of the present invention may be implemented by a processor.

In this embodiment of the present invention, the access network device sends configuration information of the at least two channel resource sets to the terminal device, where each channel resource set includes at least two channel resources. This is equivalent to that all channel resources allocated by the access network device to the terminal device are grouped, and each group is equivalent to one channel resource set. The terminal device first determines the first channel resource set of the multiple channel resource sets, and then determines the channel resource in the first channel resource set according to the channel indication information. Different channel resources may be determined at different times in a subframe according to same channel indication information, while in the prior art, only one channel resource can be determined at different times in a subframe according to same channel indication information. As a quantity of channel resources increases continuously, a quantity of bits that need to be added to the channel indication information in this embodiment of the present invention is less than that in the prior art, reducing consumption of downlink channel resources by the channel indication information in a delivery process.

Based on the foregoing embodiment, the first processing unit 112 is further configured to determine a type of the UCI. The first processing unit 112 is specifically configured to determine the channel resource set that is of the N channel resource sets and that matches the type of the UCI as the first channel resource set.

The type of the UCI includes a first type and a second type, and N=2. A first type of UCI includes channel state information CSI and hybrid automatic repeat request-acknowledgment HARQ-ACK information, and a channel resource included in one of the N channel resource sets is used to send the first type of UCI. A second type of UCI includes HARQ-ACK information but not CSI, and a channel resource included in the other of the N channel resource sets is used to send the second type of UCI.

The first processing unit 112 is further configured to determine a size of the UCI. The first processing unit 112 is specifically configured to determine the channel resource set that is of the N channel resource sets and that matches the size K of the UCI as the first channel resource set.

The first processing unit 112 is specifically configured to: determine a capacity range corresponding to each of the N channel resource sets; and determine a channel resource set of the N channel resource sets as the first channel resource set, so that the size K of the UCI meets $R_{min} \leq K \leq R_{max}$, where a capacity range of the channel resource set is $[R_{min}, R_{max}]$, $R_{min}$ is a minimum value of a capacity of the channel resource set, and $R_{max}$ is a maximum value of the capacity of the channel resource set.

Quantities of channel resources included in the N channel resource sets are the same.

At least one of the N channel resource sets includes at least two channel resources having different formats.

Alternatively, at least one of the N channel resource sets includes at least two channel resources having a same format but different channel capacities.

The first receiving unit 111 is further configured to receive configuration information of the N channel resource sets from the access network device by using higher layer signaling, where configuration information of the N channel resource sets corresponding to the different terminal devices is different.

The first processing unit 112 in this embodiment of the present invention may be implemented by a processor.

The terminal device provided in this embodiment of the present invention may be specifically configured to perform the method embodiment provided in FIG. 1. Specific functions are not described herein again.

This embodiment of the present invention specifically provides a method for determining, by the terminal device according to the type or the size of the UCI, the channel resource set matching the type or the size of the UCI of the multiple channel resource sets as the first channel resource set.

FIG. 12 is a structural diagram of an access network device according to an embodiment of the present invention. The access network device provided in this embodiment of the present invention may perform the processing procedure provided in the embodiment of the uplink control information sending method. As shown in FIG. 12, the access network device 120 includes a second sending unit 121, a second processing unit 122, and a second receiving unit 123. The second sending unit 121 is configured to send channel indication information to a terminal device on a physical control channel. The second processing unit 122 is configured to preconfigure N channel resource sets for the terminal device, so that the terminal device determines a channel resource set of the N channel resource sets as a first channel resource set, and determines a channel resource that is in the first channel resource set and that is indicated by the channel indication information, where N is a positive integer greater than or equal to 2, and each of the N channel resource sets includes at least two channel resources. The second receiving unit 123 is configured to receive uplink control information UCI sent by the terminal device on the channel resource.

The second processing unit 122 in this embodiment of the present invention may be implemented by a processor.

In this embodiment of the present invention, the access network device sends configuration information of the at least two channel resource sets to the terminal device, where each channel resource set includes at least two channel resources. This is equivalent to that all channel resources allocated by the access network device to the terminal device are grouped, and each group is equivalent to one channel resource set. The terminal device first determines the first channel resource set of the multiple channel resource sets, and then determines the channel resource in the first channel resource set according to the channel indication information. Different channel resources may be determined at different times in a subframe according to same channel indication information, while in the prior art, only one channel resource can be determined at different times in a subframe according to same channel indication information. As a quantity of channel resources increases continuously, a quantity of bits that need to be added to the channel indication information in this embodiment of the present invention is less than that in the prior art, reducing consumption of downlink channel resources by the channel indication information in a delivery process.

Based on the foregoing embodiment, quantities of channel resources included in the N channel resource sets are the same.

At least one of the N channel resource sets includes at least two channel resources having different formats.

Alternatively, at least one of the N channel resource sets includes at least two channel resources having a same format but different channel capacities.

The second sending unit 121 is further configured to send configuration information of the N channel resource sets to the terminal device by using higher layer signaling, where configuration information of the N channel resource sets corresponding to the different terminal devices is different.

The access network device provided in this embodiment of the present invention may be specifically configured to perform the method embodiment provided in FIG. 4. Specific functions are not described herein again.

This embodiment of the present invention specifically provides a method for determining, by the terminal device according to the type or the size of the UCI, the channel resource set matching the type or the size of the UCI of the multiple channel resource sets as the first channel resource set.

Figure 13:
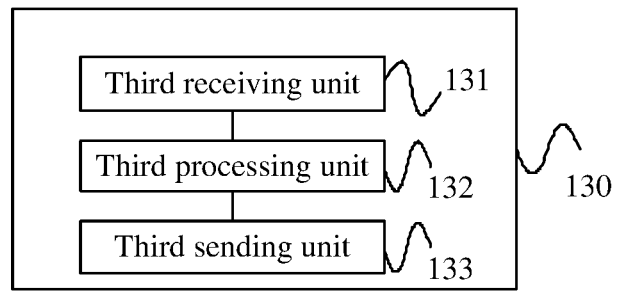
FIG. 13 is a structural diagram of a terminal device according to another embodiment of the present invention.

FIG. 13 is a structural diagram of a terminal device according to another embodiment of the present invention. The terminal device provided in this embodiment of the present invention may perform the processing procedure provided in the embodiment of the uplink control information sending method. As shown in FIG. 13, the terminal device 130 includes a third receiving unit 131, a third processing unit 132, and a third sending unit 133. The third receiving unit 131 is configured to receive channel indication information from an access network device on a physical control channel. The third processing unit 132 is configured to: determine a first channel resource of N channel resources according to the channel indication information, where N is a positive integer greater than or equal to 2, and the N channel resources are preconfigured by the access network device for the terminal device; and increase or decrease the first channel resource to obtain a second channel resource. The third sending unit 133 is configured to send uplink control information UCI to the access network device on the second channel resource.

The third processing unit 132 in this embodiment of the present invention may be implemented by a processor.

In this embodiment of the present invention, one of the at least two channel resources is determined as the first channel resource by using the channel indication information; the first channel resource is increased or decreased according to capacity information corresponding to the first channel resource and the size of the uplink control information UCI generated by the terminal device, to obtain the second channel resource; and the terminal device sends the UCI to the access network device on the second channel resource, so that a capacity corresponding to the second channel resource matches the size of the UCI. That is, when the first channel resource is greater than the size of the uplink control information UCI, the first channel resource is decreased to increase utilization of the uplink channel; when the first channel resource is less than the size of the uplink control information UCI, the first channel resource is increased to prevent discarding of UCI bits.

Based on the foregoing embodiment, the N channel resources correspond to different channel capacities. The third processing unit 132 is further configured to determine a size of the UCI. The third processing unit 132 is specifically configured to: if a channel capacity corresponding to the first channel resource is greater than the size of the UCI, decrease the first channel resource to obtain the second channel resource; or if a channel capacity corresponding to the first channel resource is less than the size of the UCI, increase the first channel resource to obtain the second channel resource.

The third processing unit 132 is specifically configured to decrease the channel capacity of the first channel resource by k basic channel elements to obtain the second channel resource, so that the size $R_a$ of the UCI meets $R_b-(k+1)R_0 < R_a \leq R_b-kR_0$, where $R_b$ indicates the channel capacity of the first channel resource, and $R_o$ indicates size of the basic channel element.

A subcarrier whose frequency is the highest in the k basic channel elements is adjacent to a subcarrier whose frequency is the lowest in the first channel resource; or a subcarrier whose frequency is the lowest in the k basic channel elements is adjacent to a subcarrier whose frequency is the highest in the first channel resource.

The third processing unit 132 is specifically configured to increase the channel capacity of the first channel resource by k basic channel elements, so that the size $R_a$ of the UCI meets $R_b+(k-1)R_0 < R_a \leq R_b+kR_0$, where $R_b$ indicates the channel capacity of the first channel resource, and $R_o$ indicates a size of the basic channel element.

A subcarrier whose frequency is the highest in the k basic channel elements is adjacent to a subcarrier whose frequency is the lowest in the first channel resource; or a subcarrier whose frequency is the lowest in the k basic channel elements is adjacent to a subcarrier whose frequency is the highest in the first channel resource.

The UCI includes at least one of HARQ-ACK information of the terminal device for received downlink data or channel state information CSI generated by the terminal device.

The third receiving unit 131 is further configured to receive configuration information of the N channel resources from the access network device by using higher layer signaling, where configuration information of the N channel resource sets corresponding to the different terminal devices is different.

The third processing unit 132 in this embodiment of the present invention may be implemented by a processor.

The terminal device provided in this embodiment of the present invention may be specifically configured to perform the method embodiment provided in FIG. 5. Specific functions are not described herein again.

In this embodiment of the present invention, the first channel resource is increased or decreased in a unit of a basic channel element, to obtain the second channel resource, so that the capacity corresponding to the second channel resource matches the size of the UCI. That is, when the first channel resource is greater than the size of the uplink control information UCI, the first channel resource is decreased to increase utilization of the uplink channel; when the first channel resource is less than the size of the uplink control information UCI, the first channel resource is increased to prevent discarding of UCI bits.

Figure 14:
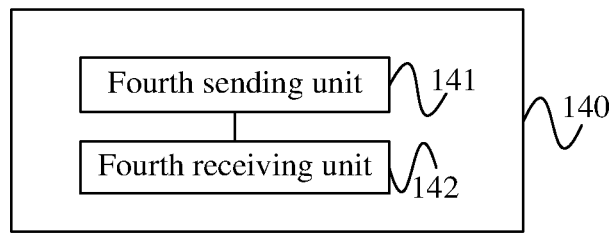
FIG. 14 is a structural diagram of an access network device according to another embodiment of the present invention.

FIG. 14 is a structural diagram of an access network device according to another embodiment of the present invention. The access network device provided in this embodiment of the present invention may perform the processing procedure provided in the embodiment of the uplink control information sending method. As shown in FIG. 14, the access network device 140 includes a fourth sending unit 141 and a fourth receiving unit 142. The fourth sending unit 141 is configured to send channel indication information to a terminal device on a physical control channel, so that the terminal device determines a first channel resource of N channel resources according to the channel indication information, and increases or decreases the first channel resource to obtain a second channel resource, where N is a positive integer greater than or equal to 2, and the N channel resources are preconfigured by the access network device for the terminal device. The fourth receiving unit 142 is configured to receive uplink control information UCI sent by the terminal device on the second channel resource.

In this embodiment of the present invention, the first channel resource is increased or decreased in a unit of a basic channel element, to obtain the second channel resource, so that the capacity corresponding to the second channel resource matches the size of the UCI. That is, when the first channel resource is greater than the size of the uplink control information UCI, the first channel resource is decreased to increase utilization of the uplink channel; when the first channel resource is less than the size of the uplink control information UCI, the first channel resource is increased to prevent discarding of UCI bits.

Based on the foregoing embodiment, the UCI includes at least one of HARQ-ACK information of the terminal device for received downlink data or channel state information CSI generated by the terminal device.

The UCI further includes scheduling request information SR.

The fourth sending unit 141 is further configured to send configuration information of the N channel resources to the terminal device by using higher layer signaling, where configuration information of the N channel resource sets corresponding to the different terminal devices is different.

The access network device provided in this embodiment of the present invention may be specifically configured to perform the method embodiment provided in FIG. 10. Specific functions are not described herein again.

In this embodiment of the present invention, one of the at least two channel resources is determined as the first channel resource by using the channel indication information; the first channel resource is increased or decreased according to capacity information corresponding to the first channel resource and the size of the uplink control information UCI generated by the terminal device, to obtain the second channel resource; and the terminal device sends the UCI to the access network device on the second channel resource, so that a capacity corresponding to the second channel resource matches the size of the UCI. That is, when the first channel resource is greater than the size of the uplink control information UCI, the first channel resource is decreased to increase utilization of the uplink channel; when the first channel resource is less than the size of the uplink control information UCI, the first channel resource is increased to prevent discarding of UCI bits.

Figure 15:
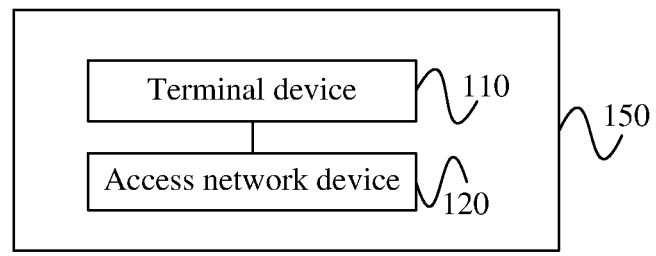
FIG. 15 is a structural diagram of an uplink control information sending and receiving system according to an embodiment of the present invention.

FIG. 15 is a structural diagram of an uplink control information sending and receiving system according to an embodiment of the present invention. The uplink control information sending and receiving system provided in this embodiment of the present invention may perform the processing procedures provided in the embodiments of the uplink control information sending method and the uplink control information receiving method. As shown in FIG. 15, the uplink control information sending and receiving system 150 includes the terminal device 110 and the access network device 120 in the foregoing embodiments.

The uplink control information sending and receiving system provided in this embodiment of the present invention may perform the processing procedures provided in the embodiments of the uplink control information sending method and the uplink control information receiving method.

Figure 16:
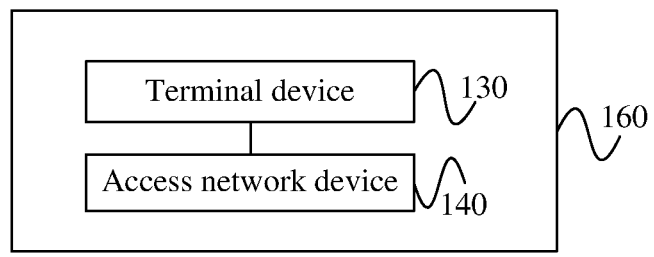
FIG. 16 is a structural diagram of an uplink control information sending and receiving system according to another embodiment of the present invention.

FIG. 16 is a structural diagram of an uplink control information sending and receiving system according to another embodiment of the present invention. The uplink control information sending and receiving system provided in this embodiment of the present invention may perform the processing procedures provided in the embodiments of the uplink control information sending method and the uplink control information receiving method. As shown in FIG. 16, the uplink control information sending and receiving system 160 includes the terminal device 130 and the access network device 140 in the foregoing embodiments.

The uplink control information sending and receiving system provided in this embodiment of the present invention may perform the processing procedures provided in the embodiments of the uplink control information sending method and the uplink control information receiving method.

In conclusion, the embodiments of the present invention provide the method for determining, by the terminal device according to the type or the size of the UCI, the channel resource set matching the type or the size of the UCI of the multiple channel resource sets as the first channel resource set, and specifically provide the method for determining, by the terminal device according to the type or the size of the UCI, a channel resource set matching the type or the size of the UCI of multiple channel resource sets as the first channel resource set: One of the at least two channel resources is determined as the first channel resource by using the channel indication information; the first channel resource is increased or decreased according to capacity information corresponding to the first channel resource and the size of the uplink control information UCI generated by the terminal device, to obtain the second channel resource; and the terminal device sends the UCI to the access network device on the second channel resource, so that a capacity corresponding to the second channel resource matches the size of the UCI. That is, when the first channel resource is greater than the size of the uplink control information UCI, the first channel resource is decreased to increase utilization of the uplink channel; when the first channel resource is less than the size of the uplink control information UCI, the first channel resource is increased to prevent discarding of UCI bits.

In the several embodiments provided in the present invention, it should be understood that the disclosed apparatus and method may be implemented in other manners. For example, the described apparatus embodiment is merely an example. For example, the unit division is merely logical function division and may be other division in actual implementation. For example, a plurality of units or components may be combined or integrated into another system, or some features may be omitted or not performed. In addition, the displayed or discussed mutual couplings or direct couplings or communication connections may be indirect couplings or communication connections between some interfaces, apparatuses, and units, or may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions of the embodiments.

In addition, functional units in the embodiments of the present invention may be integrated into one processing unit, or each of the units may exist alone physically, or two or more units may be integrated into one unit. The integrated unit may be implemented in a form of hardware, or may be implemented in a form of hardware in addition to a software functional unit.

When the foregoing integrated unit is implemented in a form of a software functional unit, the integrated unit may be stored in a computer-readable storage medium. The software functional unit is stored in a storage medium and includes several instructions for instructing a computer device (which may be a personal computer, a server, a network device, or the like) or a processor to perform some of the steps of the methods described in the embodiments of the present invention. The foregoing storage medium includes any medium that can store program code, such as a USB flash drive, a removable hard disk, a read-only memory (ROM), a random access memory (RAM), a magnetic disk, or an optical disc.

It may be clearly understood by persons skilled in the art that, for the purpose of convenient and brief description, division of the foregoing function modules is taken as an example for illustration. In actual application, the foregoing functions can be allocated to different function modules and implemented according to a requirement, that is, an inner structure of an apparatus is divided into different function modules to implement all or part of the functions described above. For a detailed working process of the foregoing apparatus, refer to a corresponding process in the foregoing method embodiments, and details are not described herein again.

Finally, it should be noted that the foregoing embodiments are merely intended to describe the technical solutions of the present invention, but not to limit the present invention. Although the present invention is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present invention.

The invention claimed is:

1. A method performed by an apparatus, comprising:
   receiving configuration information, wherein the configuration information indicates N channel resource sets, and wherein N is a positive integer greater than or equal to 2;
   receiving channel indication information on a physical control channel, wherein the channel indication information indicates a first target channel resource in a target channel resource set;
   determining a channel resource set of the N channel resource sets as the target channel resource set; and
   sending uplink control information (UCI) on the first target channel resource.

2. The method according to claim 1, wherein sending the UCI on the first target channel resource comprising:
   sending the UCI on a second target channel resource, wherein the second target channel resource is in the first target channel resource and matches quantity of bits of the UCI, and wherein a size of the second target channel resource is smaller than a size of the first target channel resource.

3. The method according to claim 1, further comprising:
   determining the channel resource set of the N channel resource sets as the target channel resource set according to quantity of bits of the UCI.

4. The method according to claim 3, wherein:
   the target channel resource set is $1^{st}$ channel resource set of the N channel resource sets when $R_\alpha \leq R_1$, $R_\alpha$ is equal to the quantity of bits of the UCI, and $R_1$ is a channel capacity corresponding to the $1^{st}$ channel resource set; or
   the target channel resource set is $i^{th}$ channel resource set of the N channel resource sets when $R_{i-1} < R_\alpha \leq R_i$, i is an integer and $2 \leq i \leq N$, $R_\alpha$ is equal to the quantity of bits of the UCI, $R_i$ is a channel capacity corresponding to the $i^{th}$ channel resource set, and $R_{i-1}$ is a channel capacity corresponding to the $(i-1)^{th}$ channel resource set.

5. The method according to claim 1, wherein:
   the UCI comprises channel state information (CSI);
   the UCI comprises CSI and hybrid automatic repeat request-acknowledgment (HARQ-ACK) information; or
   the UCI is HARQ-ACK information or CSI.

6. The method according to claim 1, wherein a difference of a size of the first target channel resource and a size of a second target channel resource is k basic channel elements, and wherein $R_b-(k+1)R_0 < R_\alpha \leq R_b-kR_0$ $R_\alpha$ is a size of the UCI, $R_b$ is a channel capacity of the first target channel resource, $K_0$ is a size of a basic channel element, and k is a positive integer.

7. The method according to claim 6, wherein the basic channel element is a resource block (RB).

8. A method performed by an apparatus, comprising:
   sending configuration information, wherein the configuration information indicates N channel resource sets, and wherein N is a positive integer greater than or equal to 2;
   sending channel indication information on a physical control channel, wherein the channel indication information indicates a first target channel resource in a target channel resource set, and wherein the target channel resource set is one channel resource set in the N channel resource sets; and
   receiving uplink control information (UCI) on the first target channel resource.

9. The method according to claim 8, wherein receiving the UCI on the first target channel resource comprising:
   receiving the UCI on a second target channel resource, wherein the second target channel resource is in the first target channel resource and matches quantity of bits of the UCI, and wherein a size of the second target channel resource is smaller than a size of the first target channel resource.

10. The method according to claim 8, wherein the target channel resource set is in accordance with quantity of bits of the UCI.

11. The method according to claim 10, wherein:
the target channel resource set is 1st first channel resource set of the N channel resource sets when $R_\alpha \leq R_1$, $R_\alpha$ is equal to the quantity of bits of the UCI, and $R_1$ is a channel capacity corresponding to the 1st channel resource set; or
the target channel resource set is $i^{th}$ channel resource set of the N channel resource sets when $R_{i-1} < R_\alpha \leq R_i$, i is an integer and $2 \leq i \leq N$, $R_\alpha$ a is equal to the quantity of bits of the UCI, $R_i$ is a channel capacity corresponding to the $i^{th}$ channel resource set, and $R_{i-1}$ is a channel capacity corresponding to the $(i-1)^{th}$ channel resource set.

12. The method according to claim 8, wherein:
the UCI comprises channel state information (CSI);
the UCI comprises CSI and hybrid automatic repeat request-acknowledgment (HARQ-ACK) information; or
the UCI is HARQ-ACK information or CSI.

13. The method according to claim 8, wherein at least one of the N channel resource sets comprises at least two channel resources with different physical uplink control channel (PUCCH) formats.

14. The method according to claim 8, wherein a difference of a size of the first target channel resource and a size of a second target channel resource is k basic channel elements, and wherein $R_b-(k+1)R_0 < R_\alpha \leq R_b-kR_0$, $R_\alpha$ is a size of the UCI, $R_b$ is a channel capacity of the first target channel resource, $R_0$ is a size of a basic channel element, and k is a positive integer.

15. The method according to claim 14, wherein the basic channel element is a resource block (RB).

16. An apparatus, comprising:
at least one processor; and
a memory storing instructions which, when executed by the at least one processor, cause the apparatus to perform operations comprising:
receiving configuration information, wherein the configuration information indicates N channel resource sets, and wherein N is a positive integer greater than or equal to 2;
receiving channel indication information on a physical control channel, wherein the channel indication information indicates a first target channel resource in a target channel resource set;
determining a channel resource set of the N channel resource sets as the target channel resource set; and
sending uplink control information (UCI) on the first target channel resource.

17. The apparatus according to claim 16, wherein a difference of a size of the first target channel resource and a size of a second target channel resource is k basic channel elements, and wherein $R_b-(k+1)R_0 < R_\alpha \leq R_b-kR_0$, $R_\alpha$ is a size of the UCI, $R_b$ is a channel capacity of the first target channel resource, $R_0$ is a size of a basic channel element, and k is a positive integer.

18. An apparatus, comprising:
at least one processor; and
a memory storing instructions which, when executed by the at least one processor, cause the apparatus to perform operations comprising:
sending configuration information, wherein the configuration information indicates N channel resource sets, and wherein N is a positive integer greater than or equal to 2;
sending channel indication information on a physical control channel, wherein the channel indication information indicates a first target channel resource in a target channel resource set, and wherein the target channel resource set is one channel resource set in the N channel resource sets; and
receiving uplink control information (UCI) on the first target channel resource.

19. The apparatus according to claim 18, wherein a difference of a size of the first target channel resource and a size of a second target channel resource is k basic channel elements, and wherein $R_b-(k+1)R_0 < R_\alpha \leq R_b-kR_0$, $R_\alpha$ is a size of the UCI, $R_b$ is a channel capacity of the first target channel resource, $R_0$ is a size of a basic channel element, and k is a positive integer.

20. A method performed by a communication system, comprising:
sending, by a first apparatus in the communication system to a second apparatus in the communication system, configuration information, wherein the configuration information indicates N channel resource sets, and wherein N is a positive integer greater than or equal to 2;
receiving, by the second apparatus, the configuration information;
sending, by the first apparatus, channel indication information on a physical control channel, wherein the channel indication information indicates a first target channel resource in a target channel resource set, and wherein the target channel resource set is one channel resource set in the N channel resource sets;
receiving, by the second apparatus, the channel indication information on the physical control channel;
determining, by the second apparatus, a channel resource set of the N channel resource sets as the target channel resource set;
sending, by the second apparatus, uplink control information (UCI) on the first target channel resource; and
receiving, by the first apparatus, the UCI on the first target channel resource.

\* \* \* \* \*

UNITED STATES PATENT AND TRADEMARK OFFICE
CERTIFICATE OF CORRECTION

Page 1 of 2

PATENT NO. : 12,150,133 B2
APPLICATION NO. : 18/147558
DATED : November 19, 2024
INVENTOR(S) : Zhiyu Yan, Lei Guan and Yongxia Lyu It is certified that error appears in the above-identified patent and that said Letters Patent is hereby corrected as shown below:

In the Claims

In Column 34, In Line 22, In Claim 4, delete "$R_\alpha \leq R_1$, $R_\alpha$" and insert -- $R_a \leq R_1$, $R_a$ --.

In Column 34, In Line 27, In Claim 4, delete "$R_{i-1} < R_\alpha \leq R_i$," and insert -- $R_{i-1} < R_a \leq R_i$, --.

In Column 34, In Line 28, In Claim 4, delete "$R_\alpha$" and insert -- $R_a$ --.

In Column 34, In Line 41, In Claim 6, delete "$R_b-(k+1)R_0 < R_\alpha \leq R_b - kR_0$ $R_\alpha$" and insert -- $R_b-(k+1)R_0 < R_a \leq R_b - kR_0$, $R_a$ --.

In Column 34, In Line 43, In Claim 6, delete "$K_0$" and insert -- $R_0$ --.

In Column 35, In Line 5, In Claim 11, delete "1st" and insert -- 1$^{st}$ --.

In Column 35, In Line 6, In Claim 11, delete "$R_\alpha \leq R_1$, $R_\alpha$" and insert -- $R_a \leq R_1$, $R_a$ --.

In Column 35, In Line 8, In Claim 11, delete "1st" and insert -- 1$^{st}$ --.

In Column 35, In Line 11, In Claim 11, delete "$R_{i-1} < R_\alpha \leq R_i$," and insert -- $R_{i-1} < R_a \leq R_i$, --.

In Column 35, In Line 12, In Claim 11, delete "$R_\alpha$" and insert -- $R_a$ --.

In Column 35, In Line 30, In Claim 14, delete "$R_b-(k+1)R_0 < R_\alpha \leq R_b - kR_0$, $R_\alpha$" and insert -- $R_b-(k+1)R_0 < R_a \leq R_b - kR_0$, $R_a$ --.

In Column 36, In Line 1, In Claim 17, delete "$R_b-(k+1)R_0 < R_\alpha \leq R_b - kR_0$, $R_\alpha$" and insert -- $R_b-(k+1)R_0 < R_a \leq R_b - kR_0$, $R_a$ --.

Signed and Sealed this
Eighteenth Day of March, 2025

Coke Morgan Stewart
*Acting Director of the United States Patent and Trademark Office*

CERTIFICATE OF CORRECTION (continued)
U.S. Pat. No. 12,150,133 B2

In Column 36, In Line 26 (Approx.), In Claim 19, delete "$R_b-(k+1)R_0 < R_\alpha \leq R_b - kR_0, R_\alpha$" and insert -- $R_b-(k+1)R_0 < R_a \leq R_b - kR_0, R_a$ --.